United States Patent
Way et al.

(10) Patent No.: US 11,729,270 B2
(45) Date of Patent: Aug. 15, 2023

(54) AUTONOMOUS VEHICLE APPLICATION PROGRAMMING INTERFACE AND COMMUNICATIONS SYSTEMS AND METHODS

(71) Applicant: Uber Technologies, Inc., San Francisco, CA (US)

(72) Inventors: Matthew James Way, Pittsburgh, PA (US); Chee Yu, Dublin, CA (US); Steve Ayers, Mars, PA (US); Patrick Greaney Willett, San Francisco, CA (US); Eli Schleifer, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 893 days.

(21) Appl. No.: 15/918,599

(22) Filed: Mar. 12, 2018

(65) Prior Publication Data

US 2019/0235486 A1    Aug. 1, 2019

Related U.S. Application Data

(60) Provisional application No. 62/623,171, filed on Jan. 29, 2018.

(51) Int. Cl.
*H04L 12/66*    (2006.01)
*H04L 67/12*    (2022.01)
(Continued)

(52) U.S. Cl.
CPC ........... *H04L 67/12* (2013.01); *G05D 1/0022* (2013.01); *G05D 1/0027* (2013.01);
(Continued)

(58) Field of Classification Search
CPC ....... H04L 67/12; H04L 67/125; H04L 12/66; G05D 2201/0212; G05D 1/0257;
(Continued)

(56) References Cited

U.S. PATENT DOCUMENTS 8,601,595 B2    12/2013    Gelvin et al.
9,014,888 B2    4/2015    Sukkarié et al.
(Continued)

FOREIGN PATENT DOCUMENTS

| EP | 3732908 | 11/2020 |
|---|---|---|
| WO | WO 2017026992 | 2/2017 |
| WO | 2019148187 | 8/2019 |

OTHER PUBLICATIONS

PCT International Search Report and Written Opinion for PCT/US2018/055127, dated Jan. 29, 2019, 15 pages.
(Continued)

*Primary Examiner* — Mathew Franklin Gordon
(74) *Attorney, Agent, or Firm* — Schwegman Lundberg & Woessner, P.A.

(57) ABSTRACT

Systems and methods for facilitating communication with autonomous vehicles are provided. In one example embodiment, a computing system (e.g., of a vehicle) can generate a first communication associated with an autonomous vehicle. The computing system can provide the first communication to an application programming interface gateway that is remote from the autonomous vehicle. Another computing system can obtain, via an application programming interface gateway, the first communication associated with the autonomous vehicle. The other computing system can determine a first frontend interface of the application programming interface gateway based at least in part on the first communication associated with the autonomous vehicle. The computing system can provide, via the first frontend interface, the first communication associated with (Continued)

the autonomous vehicle to a first system client associated with the first frontend interface.

20 Claims, 6 Drawing Sheets

(51) Int. Cl.
| | |
|---|---|
| H04W 4/44 | (2018.01) |
| G05D 1/00 | (2006.01) |
| G06Q 10/0631 | (2023.01) |
| H04L 67/125 | (2022.01) |
| G05D 1/02 | (2020.01) |

(52) U.S. Cl.
CPC ..... *G05D 1/0088* (2013.01); *G06Q 10/06315* (2013.01); *H04L 12/66* (2013.01); *H04W 4/44* (2018.02); *G05D 1/0246* (2013.01); *G05D 1/0257* (2013.01); *G05D 2201/0212* (2013.01); *H04L 67/125* (2013.01)

(58) Field of Classification Search
CPC .. G05D 1/0246; G05D 1/0088; G05D 1/0027; G05D 1/0022; G06Q 10/06315; H04W 4/44

See application file for complete search history.

(56) References Cited

U.S. PATENT DOCUMENTS

| | | | |
|---|---|---|---|
| 9,459,622 | B2 | 10/2016 | Abhyanker |
| 9,547,309 | B2 | 1/2017 | Ross et al. |
| 9,547,985 | B2 | 1/2017 | Tuukkanen |
| 10,749,960 | B2 | 8/2020 | Way et al. |
| 2003/0014521 | A1 | 1/2003 | Elson et al. |
| 2009/0077267 | A1 | 3/2009 | Alrabady et al. |
| 2012/0011067 | A1 | 1/2012 | Katzin et al. |
| 2012/0086984 | A1* | 4/2012 | Ulichney ............. H04N 1/4092 358/3.06 |
| 2012/0089684 | A1 | 4/2012 | Angus et al. |
| 2015/0339928 | A1 | 11/2015 | Ramanujam |
| 2017/0078398 | A1 | 3/2017 | Haidar et al. |
| 2017/0178504 | A1 | 6/2017 | Gotoh et al. |
| 2017/0192437 | A1* | 7/2017 | Bier ..................... G05D 1/0077 |
| 2017/0255966 | A1 | 9/2017 | Khoury |
| 2017/0264688 | A1 | 9/2017 | Sell et al. |
| 2018/0053141 | A1 | 2/2018 | Shydo, Jr. |
| 2018/0097804 | A1 | 4/2018 | Boehm |
| 2018/0189917 | A1 | 7/2018 | Shen et al. |
| 2018/0284793 | A1* | 10/2018 | Wood ..................... B60W 10/30 |
| 2018/0350160 | A1 | 12/2018 | Sainaney et al. |
| 2018/0357907 | A1* | 12/2018 | Reiley ..................... H04W 4/44 |
| 2019/0025819 | A1 | 1/2019 | Ferguson et al. |
| 2019/0113927 | A1* | 4/2019 | England ............... G05D 1/0231 |
| 2019/0238638 | A1 | 8/2019 | Way et al. |
| 2020/0160709 | A1* | 5/2020 | Ramot ................. G06Q 10/109 |

OTHER PUBLICATIONS

Search Report and Written Opinion for PCT/US2019/015665 dated Apr. 18, 2019, 31 pages.
"International Application Serial No. PCT US2019 015665, International Preliminary Report on Patentability dated Aug. 13, 2020", 11 pgs.
"European Application Serial No. 19705041.2, Communication Pursuant to Article 94(3) EPC dated Apr. 15, 2021", 5 pgs.
"U.S. Appl. No. 15/918,588, Non Final Office Action dated Aug. 1, 2019", 16 pgs.
"U.S. Appl. No. 15/918,588, Response filed Nov. 1, 2019 to Non Final Office Action dated Aug. 1, 2019", 15 pgs.
"U.S. Appl. No. 15/918,588, Final Office Action dated Dec. 23, 2019", 18 pgs.
"U.S. Appl. No. 15/918,588, Response filed Mar. 23, 2020 to Final Office Action dated Dec. 23, 2019", 8 pgs.
"U.S. Appl. No. 15/918,588, Examiner Interview Summary dated Mar. 9, 2020", 3 pgs.
"U.S. Appl. No. 15/918,588, Notice of Allowance dated Apr. 9, 2020", 8 pgs.
"U.S. Appl. No. 15/918,588, 312 Amendment filed Jul. 9, 2020", 1 pg.
"European Application Serial No. 19705041.2, Response to Communication pursuant to Rules 161(1) and 162 EPC filed Feb. 22, 2021", 23 pgs.
"European Application Serial No. 19705041.2, Response filed Aug. 23, 2021 to Communication Pursuant to Article 94(3) EPC dated Apr. 15, 2021", 8 pgs.

* cited by examiner

AUTONOMOUS VEHICLE APPLICATION PROGRAMMING INTERFACE AND COMMUNICATIONS SYSTEMS AND METHODS

PRIORITY CLAIM

The present application is based on and claims benefit of U.S. Provisional Application 62/623,171 having a filing date of Jan. 29, 2018, which is incorporated by reference herein.

FIELD

The present disclosure relates to systems and methods that provide for communications between autonomous vehicles and a remote infrastructure via an application programming interface.

BACKGROUND

An autonomous vehicle can be capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can navigate through such surrounding environment.

SUMMARY

Aspects and advantages of embodiments of the present disclosure will be set forth in part in the following description, or may be learned from the description, or may be learned through practice of the embodiments.

One example aspect of the present disclosure is directed to a non-transitory computer-readable medium storing computer-readable instructions that implement an application programming interface executed on a computing system including one or more computing devices. The application programming interface includes instructions for obtaining, via an application programming interface gateway, a communication associated with an autonomous vehicle. The application programming interface gateway includes a plurality of frontend interfaces. The application programming interface includes instructions for determining a frontend interface of the plurality of frontend interfaces of the application programming interface gateway based at least in part on the communication associated with the autonomous vehicle. The application programming interface includes instructions for providing, via the frontend interface, the communication associated with the autonomous vehicle to a system client.

Another example aspect of the present disclosure is directed to a computing system. The computing system includes one or more processors and one or more tangible, non-transitory, computer readable media that collectively store instructions that when executed by the one or more processors cause the computing system to perform operations. The operations include obtaining, via an application programming interface gateway, a first communication associated with an autonomous vehicle. The operations include determining a first frontend interface of the application programming interface gateway based at least in part on the first communication associated with the autonomous vehicle. The operations include providing, via the first frontend interface, the first communication associated with the autonomous vehicle to a first system client associated with the first frontend interface.

Yet another example aspect of the present disclosure is directed to a computer-implemented method for facilitating communications with autonomous vehicles. The method includes obtaining, by a computing system including one or more computing devices, a communication associated with an autonomous vehicle via an application programming interface gateway. The API gateway includes a plurality of frontend interfaces each associated with one or more system clients. The method includes providing, by the computing system, the communication associated with the autonomous vehicle to at least one system client via at least one of the frontend interfaces.

One example aspect of the present disclosure is directed to a computer-implemented method for communicating with remote computing systems. The method includes generating, by a computing system including one or more computing devices, a communication associated with an autonomous vehicle. The computing system is located onboard the autonomous vehicle. The method includes providing, by the computing system, the communication to an application programming interface gateway that is remote from the autonomous vehicle. The application programming interface gateway is configured to provide the communication associated with the autonomous vehicle to a system client via a frontend interface of a plurality of frontend interfaces of the application programming interface gateway. Each of the plurality of frontend interfaces is associated with at least one of a plurality of system clients.

Another example aspect of the present disclosure is directed to a computing system. The computing system includes one or more processors and one or more tangible, non-transitory, computer readable media that collectively store instructions that when executed by the one or more processors cause the computing system to perform operations. The operations include generating a first communication associated with an autonomous vehicle. The operations include providing the first communication to an application programming interface gateway that is remote from the autonomous vehicle. The application programming interface gateway is configured to provide, via a first frontend interface of a plurality of frontend interfaces of the application programming interface gateway, the first communication associated with the autonomous vehicle to a first system client of a plurality of system clients.

Yet another example aspect of the present disclosure is directed to an autonomous vehicle. The autonomous vehicle includes a vehicle client, one or more processors, and one or more tangible, non-transitory, computer readable media that collectively store instructions that when executed by the one or more processors cause the computing system to perform operations. The operations include generating, via the vehicle client, a communication associated with the autonomous vehicle. The operations include providing the first communication to an application programming interface gateway that is remote from the autonomous vehicle. The application programming interface gateway is configured to provide, via a frontend interface of the application programming interface gateway, the communication associated with the autonomous vehicle to a system client that is remote from the autonomous vehicle.

Other example aspects of the present disclosure are directed to systems, methods, vehicles, apparatuses, tangible, non-transitory computer-readable media, application programming interfaces, and memory devices for facilitating communication with autonomous vehicles.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
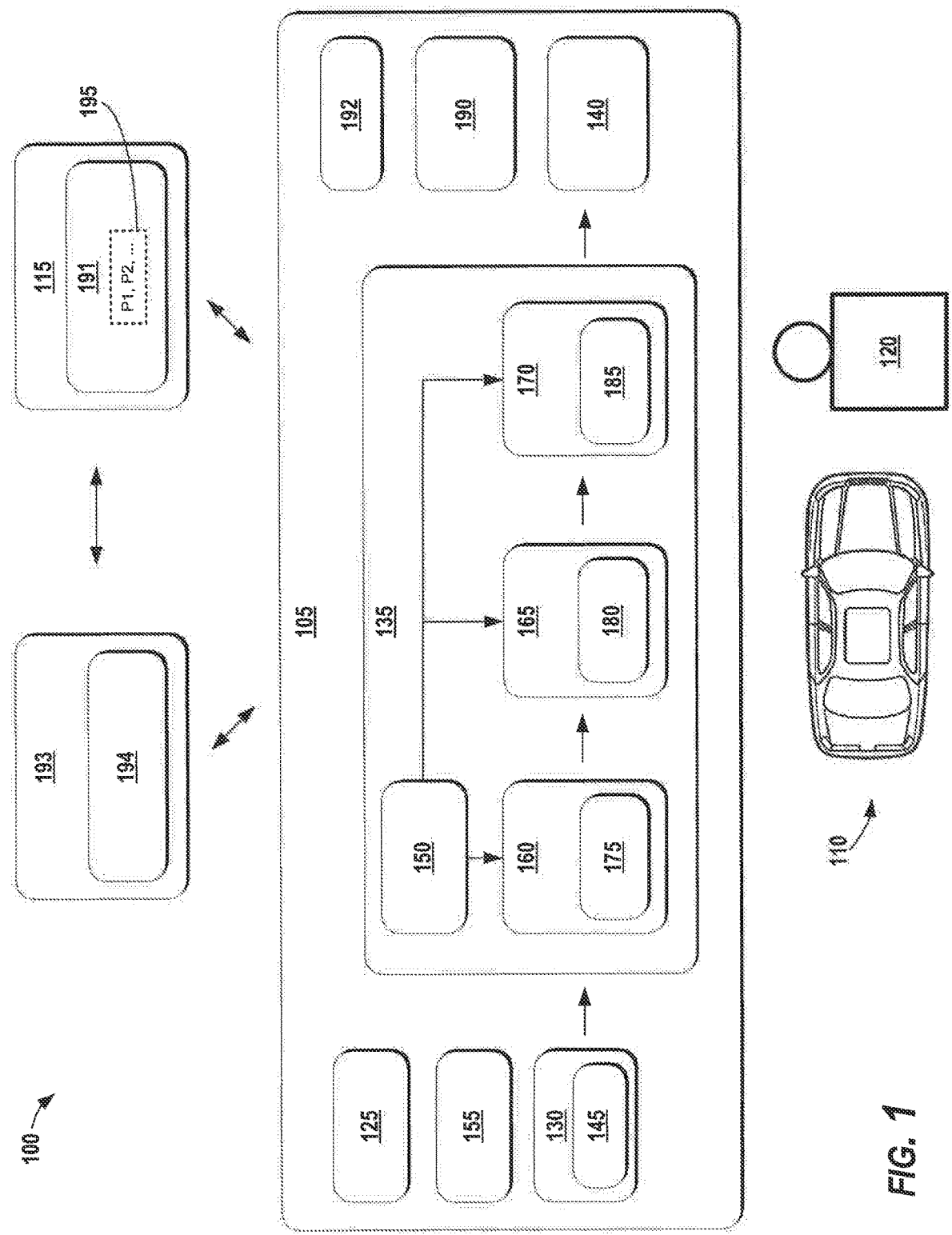
FIG. 1 depicts an example system overview according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to improving the ability of autonomous vehicles to communicate with computing system(s) that are remote from the autonomous vehicles, and vice versa. In particular, the systems and methods of the present disclosure can facilitate secure, bidirectional communications between autonomous vehicles and an entity infrastructure such as, for example, a service provider's operations system (e.g., including a data center). To do so, the entity infrastructure can include an application programming interface (API) that is configured to allow autonomous vehicles and the one or more infrastructure endpoints (e.g., system clients, etc.) to efficiently communicate.

For example, the application programming interface can include an API gateway that functions as a logical construct that contains a plurality of frontend interfaces. Each frontend interface can be associated with a system client of that entity (e.g., service provider, etc.). The system client(s) can be configured to obtain and/or provide data services, control operations, and/or other information to and/or from an autonomous vehicle. A frontend interface can serve as a public interface for external clients (e.g., a vehicle client on an autonomous vehicle, a software client on another third party system, etc.) to communicate with these system client(s).

For example, the API gateway can include a vehicle service frontend via which an autonomous vehicle can request an assignment for a transportation service (e.g., a request to be assigned to pick-up a user and transfer the user to a destination). The vehicle service frontend can be associated with a vehicle service system client that is configured to provide, for example, data indicative of a transportation service assignment to the requesting vehicle. The autonomous vehicle can request the assignment from the vehicle service system client and the vehicle service system client can provide the assignment to the autonomous vehicle via the vehicle service frontend interface. In this way, the API gateway can allow for autonomous vehicles and system clients to communicate in an efficient and secure manner that allows for expanded processing of vehicle data off-board the vehicle, analyzing such data in real time, and/or the like. Moreover, as further described herein, the application programming interface can be vehicle agnostic, allowing for any autonomous vehicle and/or compute-capable vehicle to interact with an entity's system clients. The API gateway can provide a consistent communication pipeline by which any vehicle computing system can report vehicle data (e.g., telemetry, etc.) and/or receive data (e.g., command/control messages, configuration messages, etc.) from these system clients.

More particularly, an entity (e.g., service provider, owner, manager) can use one or more vehicles (e.g., ground-based vehicles) to provide a vehicle service such as a transportation service (e.g., rideshare service), a courier service, a delivery service, etc. The vehicle(s) can be autonomous vehicles that include various systems and devices configured to control the operation of the vehicle. For example, an autonomous vehicle can include an onboard vehicle computing system for operating the autonomous vehicle (e.g., located on or within the autonomous vehicle). The vehicle computing system can obtain sensor data from sensor(s) onboard the vehicle (e.g., cameras, LIDAR, RADAR, etc.), attempt to comprehend the vehicle's surrounding environment by performing various processing techniques on the sensor data, and generate an appropriate motion plan through the vehicle's surrounding environment. Moreover, an autonomous vehicle can be configured to communicate with one or more computing devices that are remote from the vehicle. For example, the autonomous vehicle can communicate with a remote computing system that can be associated with the entity, such as the entity's operations computing system. The operations computing system can include a plurality of system clients that can help the entity monitor, communicate with, manage, etc. autonomous vehicles. In this way, the entity can manage the autonomous vehicles to provide the vehicle services of the entity.

The autonomous vehicles utilized by the entity to provide the vehicle service can be associated with a fleet of the entity or a third party. For example, the entity (e.g., the service provider) may own, lease, etc. a fleet of autonomous vehicles that can be managed by the entity (e.g., the system clients) to provide one or more vehicle services. An autonomous vehicle utilized to provide the vehicle service(s) can be included in this fleet of the entity. Accordingly, in some implementations, the systems and methods of the present disclosure can support a closed infrastructure in which only vehicles included in the fleet of the entity can communicate with the system clients.

In some implementations, an autonomous vehicle can be associated with a third party such as, for example, an individual, an original equipment manufacturer (OEM), or another entity. Even though such an autonomous vehicle may not be included in the fleet of autonomous vehicles of the entity, the application programming interface of the present disclosure can allow the autonomous vehicle to still be utilized to provide the vehicle services offered by the entity, access its system clients, etc. In this way, the systems and methods of the present disclosure can support an open infrastructure, in which vehicles included in the fleet of the entity and/or vehicles that are not included in the fleet of the entity can communicate with the system clients, if desired.

In some implementations, the systems and methods of the present disclosure can support a semi-open infrastructure. For example, vehicles in the entity's fleet as well as any vehicle of an authorized vehicle provider can be allowed to communicate with the system clients (e.g., using the systems and methods described herein). An authorized vehicle provider can be another entity that is provided with data (e.g., cryptography key) that can be used by that other entity to authorize its vehicles to communicate with the infrastructure (e.g., register vehicles so that the vehicles may be authorized to communication with the system clients).

To help access the application programming interface, an autonomous vehicle can include a vehicle client. Data indicative of the vehicle client can be provided to an autonomous vehicle by the operations computing system associated with the entity and/or provided to a third party that can then help implement the vehicle client on the autonomous vehicle. The vehicle client can be implemented via hardware and/or software onboard the vehicle, such that the vehicle's computing system can access the application programming interface associated with the entity. This can allow an autonomous vehicle that is part of the entity's fleet and/or a third party autonomous vehicle to communicate with the back-end services of the entity (e.g., the system clients). Additionally, or alternatively, a third party computing system that is remote from the autonomous vehicle (e.g., a third party operations system) can implement the vehicle client such that the third party computing system can communicate with the operations computing system of the entity and the back-end services associated therewith.

The vehicle client can allow a vehicle computing system to generate a communication associated with the autonomous vehicle that can be read and understood by the API gateway. For instance, the vehicle computing system can invoke, via the vehicle client, an application programming interface to access a library indicative of a plurality of parameters. The library can include, for example, a central repository for parameters that can be used to generate a communication (e.g., query string, message, data set, etc.) to be sent to the API gateway. The parameters can be indicative of definitions that can be used by the vehicle computing system to determine how to structure a communication such that the API gateway is able to properly route the communication and the appropriate system client is able to process the communication and return the appropriate data, if necessary. For instance, using the vehicle client, the vehicle computing system can access the library associated with the application programming interface and generate a communication that indicates that the autonomous vehicle is available to provide a vehicle service (e.g., to transport a user) based at least in part on the parameter(s) of the library.

The vehicle computing system can provide such a communication to the API gateway, which is remote from the autonomous vehicle. The API gateway can be maintained in a telecommunications network system of the entity's infrastructure. For instance, the API gateway can be implemented by one or more computing devices of an entity's operations computing system that is remote from the autonomous vehicle. The telecommunications network system can include standalone, regionally specific operations computing systems that manage the communications from an autonomous vehicle. By way of example, the telecommunications network system can include a first regional operations computing system that is associated with the west coast of the United States and a second regional operations computing system that is associated with the east coast of the United States. Each regional operations computing system can include an API gateway associated with that geographic region, which can be utilized by the autonomous vehicles within that geographic region. Moreover, in the event one regional operations computing system experiences a failure event, communications from the vehicles of that region can be routed to another region as a failsafe procedure. In this way, the use of multiple, redundant, regionally specific operations computing systems can provide a more reliable and scalable solution for transferring data to and/or from a plurality of autonomous vehicles.

The API gateway can be a logically consolidated point of ingress and egress of all communications from and/or to the autonomous vehicles and an operations computing system. Moreover, the API gateway can be a logical construct that contains all vehicle and/or service facing interfaces. For example, the API gateway can include a plurality of frontend interfaces. Each frontend interface can be associated with at least one system client. A system client can be the hardware and/or software implemented on a computing system (e.g., of the entity) that is remote from the autonomous vehicle and that provides a particular back-end service to an autonomous vehicle (e.g., scheduling of vehicle service assignments). A frontend interface can be the interface (e.g., a normalized interface) that allows one application and/or system (e.g., of the autonomous vehicle) to provide data to and/or obtain data from another application and/or system (e.g., a system client). Each frontend interface can have one or more functions that are associated with the particular frontend interface. The autonomous vehicle can provide a communication to the API gateway to call a function of a frontend interface. In this way, the frontend interfaces can be an external facing edge of the entity infrastructure that is responsible for providing a secure tunnel for a vehicle and/or other system to communicate with a particular system client so that the vehicle and/or other system can utilize the back-end service associated with that system client, and vice versa.

The API gateway can include a variety of different frontend interfaces to accommodate for the various different system clients of the operations computing system. For example, the API gateway can include a base frontend interface. The base frontend interface can be associated with a system client that provides a telemetry data service. The base frontend interface can be an interface between an autonomous vehicle and, at least, this system client. For instance, the base frontend interface can be utilized by the autonomous vehicle and the associated telemetry system client to obtain vehicle state data. The vehicle state data can include information about the past, present, and/or future state of the autonomous vehicle, a geospatial state representation of the autonomous vehicle, environmental qualifiers, and/or other information. For example, the vehicle state data can be indicative of the autonomous vehicle's past, current, or future (planned): location (also referred to as position or pose); speed (also referred to as velocity); acceleration, heading; orientation; route of the autonomous vehicle; vehicle trajectory; objects detected within the vehicle's surrounding environment (e.g., the bounding shapes associated therewith); vehicle diagnostic data; other data for modeling vehicle state, etc. The base frontend interface can be configured to provide an interface by which the vehicle computing system can provide such vehicle state data to the telemetry system client and/or the telemetry system client can provide a set of data to the vehicle (e.g., a request for vehicle state data). For example, the base frontend interface can be associated with a "report state" function which the autonomous vehicle can call (e.g., via a communication) to report the vehicle state data to the telemetry system client.

In some implementations, the base frontend interface can include and/or provide communications to a vehicle state manager. The vehicle state manager can be configured to maintain a record of the most recent vehicle state data and propagate such information (e.g., to interested system clients). By way of example, the vehicle state manager can obtain vehicle state data indicative of the current position of the autonomous vehicle and the current route that the autonomous vehicle is following. The vehicle state manager can determine whether this reported vehicle state data is new (in comparison to past vehicle state data). In the event that the vehicle state data is new, the vehicle state manager can update its record and propagate the updated vehicle state data to one or more system clients, such as the telemetry system client.

In some implementations, the API gateway can include a fleet-specific frontend interface. The fleet-specific frontend interface can be associated with a system client that processes, analyzes, manages, etc. data that is specific to the fleet of the entity. The fleet-specific frontend interface can provide an interface between the autonomous vehicles (of the entity's fleet) and such a fleet-specific system client. For instance, the fleet-specific frontend interface can be utilized by an autonomous vehicle and the fleet-specific system client to obtain and provide fleet-specific vehicle data. The fleet-specific vehicle data can include, for example, a relative vehicle position (pose) estimate that is defined relative to one or more points-of-interest identified by the entity, certain map-based configurations of the autonomous vehicle, specific vehicle log metadata that may be of interest to the entity and/or only available via the autonomous vehicles of the entity's fleet, vehicle constraints specific to the entity's fleet, and/or other information. The fleet-specific frontend interface can be configured to provide an interface by which a vehicle computing system can provide such fleet-specific vehicle data to the fleet-specific system client, or vice versa. For example, the fleet-specific frontend interface can be associated with a "Report Map Configuration" function which the autonomous vehicle can call (e.g., via a communication) to report certain fleet specific map-based configurations.

In some implementations, portions of the application programming interface such as the fleet-specific frontend interface, library parameters associated with fleet-specific data, etc. may be unavailable (e.g., not published, restricted, etc.) to autonomous vehicles that are not included in the entity's fleet. For example, the API gateway can utilize an access control list (ACL) and/or other access control procedure to determine whether an autonomous vehicle is permitted to access fleet-specific portions of the library and/or the fleet-specific frontend interface. This can prevent autonomous vehicles that are not included in the entity's fleet from communicating with a fleet-specific system client.

In some implementations, the API gateway can include an assistance frontend interface. The assistance frontend interface can be associated with a system client that provides assistance to an autonomous vehicle and/or a user of the vehicle. The assistance frontend interface can be an interface between an autonomous vehicle and, at least, this assistance system client. For instance, the assistance frontend interface can include an "Assistance Request" function, which the autonomous vehicle can call (e.g., via a communication) to request assistance. In this way, the assistance frontend interface can allow the autonomous vehicle and/or a human-machine interface onboard the vehicle (e.g., a user device) to request assistance from the assistance system client. A request for assistance of the autonomous vehicle can include, for example, a request for a remote computing system and/or a human operator to take control of the autonomous vehicle from a remote location, a request for a human operator to contact a user of the vehicle (e.g., to address a user-related issue), and/or other information.

The assistance frontend interface can also, or alternatively, provide an interface for the autonomous vehicle to provide data that can be used by the assistance system client (and/or a human operator) to help provide the appropriate assistance to the autonomous vehicle. For example, the assistance frontend interface can allow the assistance system client to obtain streaming real-time data from a vehicle (or at least near real-time data, accounting for transmission and/or processing delays). This can include a live stream of sensor data (e.g., data from onboard camera, LIDAR, RADAR, etc.) and/or other telemetry data. The assistance frontend interface can also provide an interface for the assistance system client to provide data to assist the autonomous vehicle and/or a user of the vehicle. For example, the assistance system client can provide, via the frontend interface, a set of data that includes one or more control signals to control the motion of the autonomous vehicle (e.g., by a human operator) from a location that is remote from the autonomous vehicle. Additionally, or alternatively, the assistance system can provide, via the frontend interface, one or more messages to appear on a user device associated with a user and/or establish a live video conference with the user. In some implementations, the assistance system client can obtain communications via a different frontend interface. For example, the assistance system client may obtain vehicle state data via the base frontend interface. Such vehicle state data may help the assistance system client (and/or a human operator) provide assistance to a distressed autonomous vehicle and/or user.

In some implementations, the API gateway can include a vehicle service frontend interface. The vehicle service frontend interface can be associated with a system client that helps coordinate the provision of vehicle services by the autonomous vehicle. As described herein, the vehicle services can include, for example, transportation services, delivery services, courier services, etc. The vehicle service interface can be an interface between an autonomous vehicle and, at least, the vehicle service system client. For instance, the vehicle service interface can be utilized by the autonomous vehicle and the vehicle service system client to obtain and/or provide vehicle service data. The vehicle service data can include, for example, data indicating that the autonomous vehicle is available to provide a vehicle service (e.g., data indicating that the vehicle is online, a request for a vehicle service assignment, an indication that the vehicle is not currently assigned to a vehicle service assignment, an indication that the vehicle will soon be available for an assignment, that an assignment will be/is ending, etc.), data indicating a vehicle service assignment for an autonomous vehicle, data indicating an acceptance of a vehicle service assignment, data indicating the cancellation of a vehicle service assignment (e.g., by the vehicle, by a user, etc.), data indicating that a vehicle service assignment is complete, and/or other information. In some implementations, the vehicle service interface can allow the vehicle service system client to provide a set of data indicative of an origin location (e.g., pick-up location for user and/or item, etc.), a destination location (e.g., drop-off/delivery location for user and/or item, etc.), a set of data indicative of a route that the vehicle is to follow (or suggested to follow) for the particular vehicle service assignment, and/or other parameters for a vehicle service assignment. In some implementations, the autonomous vehicle can provide a revised and/or suggested vehicle service assignment parameter to the system client via the vehicle service frontend interface. For example, a third party autonomous vehicle may provide a communication to the vehicle service system client, via the vehicle service frontend interface, that includes a suggestion for a different origin location, destination location, route, etc. The system client can provide a set of data accepting, denying, etc. such a suggestion. The autonomous vehicle can call a function associated with the vehicle service frontend interface (e.g., "Get Assignment" function, "Accept Assignment" function, "Cancel Assignment" function, "Suggest Change" function, etc.) to communicate with the vehicle service system client.

In some implementations, the API gateway can include a compensation frontend interface. The compensation frontend interface can be associated with a system client that coordinates the provision of compensation for vehicle services rendered by an autonomous vehicle. The compensation frontend interface can be an interface between an autonomous vehicle and/or another remote computing system (e.g., of a third party entity that is associated with a non-fleet vehicle) and such a compensation system client. The autonomous vehicle and/or other remote computing system can provide, via the compensation frontend interface, a request for compensation associated with a vehicle service provided by the autonomous vehicle. For example, the autonomous vehicle can provide a communication to call a "Process Compensation" function of the compensation frontend interface. The compensation system client can obtain such a communication via the compensation frontend interface (e.g., the "Process Compensation" function). The compensation system client can be configured to process compensation for the autonomous vehicle and/or the third party system and/or facilitate such processing. The compensation system client can provide, via the compensation frontend interface, a set of data associated with the compensation. This set of data can include, for example, a transfer of compensation, a confirmation that compensation has been transferred to an appropriate account, an indication that the compensation will be transferred and/or that the transfer is pending, and/or other information. In this way, the compensation frontend interface can provide a secure, dedicated tunnel for requesting and receiving compensation and/or a confirmation associated therewith.

In some implementations, the API gateway can include a user interface (UI) frontend interface. The UI frontend interface can be associated with a system client that manages the design, function, etc. of a user interface to be displayed via a display device onboard the autonomous vehicle. The UI frontend interface can be an interface between an autonomous vehicle (e.g., a vehicle included in the entity's fleet, a vehicle not included in the entity's fleet, etc.) and the UI system client. The autonomous vehicle can provide, via the UI frontend interface, a request for data indicative of the user interface and the UI system client can provide, via the UI frontend interface, data indicative of the user interface. In this way, the entity can control the user interface to be displayed to users of a vehicle while the vehicle is deployed for vehicle services.

In some implementations, the human-machine interfaces of the autonomous vehicle can be configured to communicate with the onboard vehicle computing system of the autonomous vehicle and/or the system client(s). A human-machine interface of the autonomous vehicle can include, for example, a user device (e.g., tablet, laptop, gaming system, etc.) located onboard the autonomous vehicle and/or other device(s) (e.g., speakers, etc.) that can provide information to a user. A user of the autonomous vehicle can utilize the human-machine interface (e.g., provide input to a tablet, view a display device, listen to audio content over the speakers, etc.) while the user is within the autonomous vehicle (e.g., while riding for a transportation service). To help improve the user's experience while using the autonomous vehicle, the human-machine interface can obtain data for presentation to the user.

In some implementations, a human-machine interface can obtain data from onboard the vehicle computing system. For instance, the human-machine interface may obtain data indicative of the LIDAR points clouds of objects perceived by the autonomous vehicle from the vehicle computing system and display a visual representation of the point clouds via a display device for the user.

In some implementations, the infrastructure for the data to be utilized by a human-machine interface can be located off-board the autonomous vehicle via one or more system clients. For instance, a human-machine interface (HMI) can include an HMI client that allows the human-machine interface (e.g., tablet, etc.) to invoke the application programming interface and communicate with one or more system clients, via the API gateway. The HMI client can allow the human-machine interface to generate communications for the API gateway. These communications can be provided by the human-machine interface to the API gateway in order to obtain data from a variety of system clients (e.g., via various frontend interfaces). For example, in some implementations, the human-machine interface may obtain vehicle state data from the telemetry system client, via the telemetry frontend interface. This can allow the human-machine interface to inform the user of the current state of vehicle (e.g., via a visual representation on a display device, via onboard speakers, etc.). Accordingly, the user can understand that the vehicle is operating correctly as well as perceiving objects within the surrounding environment. In another example, the human-machine interface may obtain user interface data from the UI system client, via the UI frontend interface (e.g., for display via a display device of a tablet). In another example, the human-machine interface may allow a user to request assistance (e.g., by providing user input to a tablet) from the assistance system client, via the assistance frontend interface. In some implementations, the operations computing system can include a dedicated user experience (UEX) system client configured to obtain and/or provide data for communication to a user and/or otherwise to enhance a user experience (e.g., news updates, weather information, estimate time to arrival, etc.). By implementing the user experience service as a system client, the application programming interface can allow third party autonomous vehicles to more easily integrate with the entity infrastructure. Moreover, this can allow the entity to better control the user experience, leading to a more consistent and reliable user experience across both third party and fleet autonomous vehicles.

In some implementations, the API gateway can provide for the operations computing system to deploy software to an autonomous vehicle. For instance, the operations computing system can be configured to provide software deployments to autonomous vehicles. The software deployments can include, for example, software updates, new software packages, debugging software, security-related software, and/or other software data. Such software deployments can be handled by a dedicated system client and/or by a variety of system clients that provide software deployments associated with that system client's particular back-end service. Moreover, the software deployments can be provided to an autonomous vehicle via a software deployment frontend interface and/or by the separate interfaces associated with each particular system client. The software deployments can be provided in response to a vehicle's request for such software and/or unilaterally, without such request. By way of example, an autonomous vehicle can travel to a maintenance location when the autonomous vehicle is not providing a vehicle service to a user (e.g., in between providing rideshare transportation). While at the maintenance location, the autonomous vehicle can connect to a wired network. The autonomous vehicle can provide a message, via a frontend interface of the API gateway, indicating to a system client that the vehicle is available for a software deployment (e.g., over the wired network). This can include, for example, a request for any software updates. The system client can provide, via the frontend interface, a set of data that includes the software deployment to the autonomous vehicle. In this way, the API gateway can act as a conduit for deploying new and/or updated software to autonomous vehicles.

The following provides an end-to-end example for how an autonomous vehicle can communicate with one or more system clients via the API gateway. A similar such process can be utilized by a third party computing system that is remote from the autonomous vehicle and the operations computing system (e.g., that houses the API gateway). The vehicle computing system of an autonomous vehicle (e.g., included in an entity's fleet or not included in the entity's fleet) can generate a communication associated with the autonomous vehicle. The communication can be generated to request data from the entity's operations computing system, upload data to the operations computing system (without a request for return data), in response to a request for data from the operations computing system (e.g., a request from a system client), and/or under other circumstances. The communication (e.g., message, query string, other data, etc.) can be formulated based on the parameters included in a library associated with an application programming interface (e.g., that includes the API gateway). As described herein, the communication can include, for example, an indication that the autonomous vehicle is available to provide a vehicle service, a request for compensation associated with a vehicle service provided by the autonomous vehicle, vehicle state data associated with the autonomous vehicle, a request for assistance of the autonomous vehicle, a request for data associated with a user interface, a request for data to be utilized by a human-machine interface, an indication that the autonomous vehicle is available for a software deployment, etc. The autonomous vehicle can provide the communication to the API gateway that is remote from the autonomous vehicle. This can include providing the communication directly to the API gateway and/or indirectly by proxy. The communication can be provided to the API gateway of the regional operations system associated with the same geographic region in which the vehicle is located, and/or another region in the event of a failure event.

As described herein, the API gateway can be configured to route the communication associated with the autonomous vehicle to a system client via a frontend interface of a plurality of frontend interfaces. For instance, the API gateway can obtain the communication associated with the autonomous vehicle (e.g., directly, via a proxy, etc.). The API gateway can determine a frontend interface of the plurality of frontend interfaces based at least in part on the communication associated with the autonomous vehicle. For instance, the vehicle client can structure the communication to include metadata (e.g., tag, identifier, etc.) that identifies a frontend interface and/or a system client. The API gateway can process the communication to select a frontend interface based at least in part on the metadata. The API gateway can include internal logic that processes the communication and routes the communication to a frontend interface. In some implementations, this can include middleware that can route the communication based on heuristics and/or load. In some implementations, this can include dynamic routing of the communication where the communication is checked for validity and dropped in the event that it is invalid.

As described herein, the API gateway can provide the communication associated with the autonomous vehicle to a system client, via a frontend interface. For instance, the frontend interface can process the raw contents of the communication (e.g., requesting the vehicle service assignment) and buffer a series of data grams associated with the communication. The frontend interface can de-serialize the communication into a format that can be read by the frontend interface. In some implementations, the frontend interface can decrypt the communication in the event that it has been encrypted. Additionally, or alternatively, the frontend interface can assess whether the communication is valid (e.g., by confirming a signature if it is signed cryptographically, etc.) to ensure that the communication is trusted and authorized to be provided to a system client. For example, the vehicle service frontend interface can process the communication requesting the vehicle service assignment to determine whether the communication is valid and associated with an authorized autonomous vehicle. If so, the communication can be provided to the vehicle service system client via the vehicle service frontend interface, which establishes a communication session between the autonomous vehicle and the vehicle system client. If not, the invalid communication can be dropped and/or queued for re-processing.

The system client can obtain, via the frontend interface, the communication associated with the autonomous vehicle. The system client can determine whether a responsive set of data is necessary based at least in part on the communication. If not, the system client can store at least a portion of the communication. For example, in the event that the communication is reporting vehicle state data (without a request for data), the system client can store the vehicle state data without providing a return set of data and/or simply provide a receipt confirmation.

If the communication includes a data request, the system client can provide a set of data to the autonomous vehicle, via the frontend interface. For example, the vehicle service system client can obtain, via the vehicle service frontend interface, the communication requesting a vehicle service assignment for the autonomous vehicle. In response to the communication, the vehicle service system client can determine a vehicle service assignment for the autonomous vehicle. This can include, for example, the transportation of a user from a pick-up location to a drop-off location. The vehicle service system client can provide, via the vehicle service frontend interface, a set of data to the autonomous vehicle indicating the vehicle service assignment (e.g., the pick-up location, drop-off location, route, etc.). In some implementations, the frontend interface can perform a similar validation process on the set of data from the system client. If valid, the set of data can be provided to the autonomous vehicle. In this way, the frontend interface can provide a fully bi-directional and secure communication tunnel between the autonomous vehicle and the back-end services of the system clients.

In some implementations, an autonomous vehicle can be configured to selectively invoke an application programming interface of a plurality of application programming interfaces. For instance, an autonomous vehicle can be configured to provide vehicle services for a plurality of entities, such as a first entity and a second entity. The vehicle computing system can identify the first entity as the entity for which the autonomous vehicle should provide the vehicle service. In some implementations, this determination can be based at least in part on user input (e.g., to a user interface of the autonomous vehicle). For example, the vehicle computing system can obtain data indicative of user input provided to a user interface displayed onboard the autonomous vehicle. The user input can select the first entity as the entity for which the autonomous vehicle is to provide vehicle services. In some implementations, the selection of the first or second entity can be based at least in part on the demand for vehicle services of a particularly entity. For example, the vehicle computing system can obtain data indicating that the demand for the vehicle services of the first entity are higher than the demand for the vehicle services of the second entity. In some implementations, the vehicle computing system can obtain data indicative of an incentive (e.g., increase in compensation) to provide vehicle services for a particular entity and the vehicle computing system can select that entity accordingly.

The vehicle computing system can invoke, via a vehicle client, the application programming interface for the selected entity (e.g., the first entity). The vehicle computing system can provide (e.g., via an API gateway) a communication to the operations computing system of the first entity to indicate that the autonomous vehicle is available for a vehicle service assignment, obtain a vehicle service assignment, and provide and/or obtain other data, as described herein. In the event that the vehicle computing system determines that the autonomous vehicle should provide vehicle services for the second entity, the vehicle computing system can terminate the session with the API gateway of the first entity (e.g., provided via a frontend interface). The vehicle computing system can invoke the application programming interface of the second entity. Accordingly, the vehicle computing system can provide (e.g., via another API gateway) a communication to the operations computing system of the second entity to indicate that the autonomous vehicle is available for a vehicle service assignment, obtain a vehicle service assignment, and provide and/or obtain other data, as described herein. In this way, the autonomous vehicle can selectively communicate with the computing systems of different entities, via different application programming interfaces.

In some implementations, the application programming interface of the present disclosure can function as a relay that facilitates the communication of data (e.g., between an autonomous vehicle and a system client) that is opaque to the application programming interface. For instance, common functionality, such as a vehicle reporting its position, or a system client instructing a vehicle to lock its doors, can be different than other implementation-specific functionality such as the assistance system client passing an issue resolution to a vehicle. Accordingly, the application programming interface can provide a mechanism through which an autonomous vehicle (and/or another system) can make opaque requests and wait for a response from a system client, or vice versa. A relayed remote procedure call (RPC) process can be utilized to allow the application programming interface to monitor what is being passed (bidirectionally), and as part of the evolution of the frontend interfaces, relevant opaque, service-level RPCs can be promoted into a concrete application programming interface. This can help evolve the application programming interface overtime to accommodate for commonly communicated data.

The systems and methods described herein provide a number of technical effects and benefits. For instance, the systems and methods can provide for abstracting a vehicle platform from an operations system infrastructure. For example, an application programming interface platform according to the present disclosure can provide for reasoning about vehicles (e.g., autonomous vehicles and/or compute capable vehicles) more generically such that an entity can easily introduce different vehicles (e.g., vehicles included in the entity's fleet, vehicles from different third parties, etc.) to the operations system, thereby allowing for easier and/or faster expansion of the entity's vehicle services. As such, the application programming interface can provide a consistent, secure, well-defined, and stable communication mechanism that supports both fleet and non-fleet vehicles. Moreover, the application programming interface can allow other off-board computing systems, such as the computing systems of a third party (e.g., OEM) to communicate with the operations system (and associated system clients).

The systems and methods described herein can provide technical effects and benefits including providing for quickly aggregating data from a large number of vehicles. For example, in some implementations, the API gateway can concurrently be in communication with a large number of vehicles and can quickly route data to and/or from multiple vehicles to a plurality of system clients.

The systems and methods described herein can provide technical effects and benefits including providing for a decentralized system that can provide increased scalability. For example, the application programming interface can provide an architecture, such as the frontend interfaces (e.g., acting as communication pipelines), message routing and/or the like, that allow for significant scalability in terms of processing data from any number of vehicles. Such scalability can provide for more processing off-board the vehicle allowing for more complex processing of vehicle data than can be done onboard the vehicle.

The systems and methods of the present disclosure can provide an improvement to vehicle computing technology, such as autonomous vehicle computing technology and the remote computing systems associated therewith. For instance, the application programming interfaces, systems, and methods of the present disclosure provide a more secure and computationally efficient approach to communicating data to and/or from autonomous vehicles and computing systems remote from the autonomous vehicles. For example, a computing system (e.g., of an autonomous vehicle) can generate a communication associated with the autonomous vehicle. The vehicle computing system can provide the communication to an API gateway that is remote from the autonomous vehicle. As described herein, the API gateway can be configured to provide the communication to a system client via a frontend interface of a plurality of frontend interfaces of the API gateway. Each of the plurality of frontend interfaces can be associated with at least one of a plurality of system clients. For example, the API gateway can obtain the communication and determine a frontend interface based at least in part on the communication. The API gateway can provide, via the first frontend interface, the communication associated with the autonomous vehicle to the system client associated with the frontend interface. By utilizing a plurality of frontend interfaces, the API gateway can provide secure multiplexing of data over different communication streams. Moreover, the frontend interfaces provide layer functionality that can help allow the API gateway to provide an improved system via which the autonomous vehicle (and/or another system) can communicate with system clients of an entity. For example, the frontend interfaces can create an access-controllable, bi-directional, and secure communication session with a particular system client. This provides a secure real-time (or at least near real-time) platform-agnostic data transport that is traceable, quantifiable, predictable, and reliable, with multiple levels of QoS while also having low-overhead. Additionally, the API gateway of systems and methods of the present disclosure allow for better bandwidth/channel capacity management, testability, and vehicle monitoring. Ultimately, this can increase the efficiency of data transmission to and/or from an autonomous vehicle.

Additionally, the inclusion of separate independent frontend interfaces is a more scalable solution. For example, as system clients are added, updated, and/or removed, the frontend interfaces can be easily added, updated, and/or removed from the API gateway without disturbing other system clients and/or frontend interfaces. This can improve the flexibility of the operations computing system and its infrastructure, while also leading to less system (and vehicle) downtime. Moreover, this can accelerate both engineering and operational efforts by scaling and improving the supporting infrastructure by introducing well-defined, foundational, federated data paths through the application programming interface.

With reference now to the FIGS., example embodiments of the present disclosure will be discussed in further detail. FIG. 1 illustrates an example system 100 according to example embodiments of the present disclosure. The system 100 can include a vehicle computing system 105 associated with a vehicle 110. The system 100 can include an operations computing system 115 that is remote from the vehicle 110.

In some implementations, the vehicle 110 can be associated with an entity (e.g., a service provider, owner, manager). The entity can be one that offers one or more vehicle service(s) to a plurality of users via a fleet of vehicles that includes, for example, the vehicle 110. The entity (e.g., the service provider) may own, lease, manufacture, outfit, etc. a fleet of vehicles that can be managed by the entity (e.g., the system clients) to provide one or more vehicle services. The vehicle 110 may be included in a fleet of vehicles of the entity. In some implementations, only vehicles included in the entity's fleet can communicate and/or access the entity's application programming interface, as further described herein.

In some implementations, the vehicle 110 can be associated with a third party. For example, the vehicle 110 may not be included in a fleet of vehicles of the entity. The vehicle 110 can be own, leased, and/or otherwise affiliated with an individual, an original equipment manufacturer (OEM), and/or another third party that is different than the entity. Even though such a vehicle may not be included in the fleet of vehicles of the entity, the vehicle can still communicate with the operations computing system 115, which can be associated with the entity. A third party vehicle can still be configured to and utilized to provide the vehicles services offered by the entity, as described herein. In some implementations, vehicles included in the entity's fleet and vehicles that are not included in the entity's fleet can communicate and/or access the entity's application programming interface, as further described herein.

In some implementations, the vehicle 110 can be associated with an authorized vehicle provider. The authorized provider can be another entity that is provided with data (e.g., cryptography key) that can be used by that other entity to authorize its vehicles to communicate with the entity's infrastructure (e.g., register vehicles so that the vehicles may be authorized to communicate with the system clients). In some implementations, only vehicles included in the entity's fleet and vehicles associated with an authorized vehicle provider may be allowed to communicate and/or access the entity's application programming interface, as further described herein.

The vehicle service(s) can include transportation services (e.g., rideshare services in which a user rides in the vehicle 110 to be transported, etc.), courier services, delivery services, and/or other types of services. The vehicle service(s) can be offered to user(s) 120 by the entity, for example, via a software application (e.g., a mobile phone software application). The entity can utilize the operations computing system 115 to coordinate and/or manage the vehicle 110 (and its associated fleet, if any) to provide the vehicle services to the user(s) 120 (e.g., to transport a user, transport an item, etc.).

The operations computing system 115 can include one or more computing devices that are remote from the vehicle 110 (e.g., located off-board the vehicle 110). For example, such computing device(s) can be components of a cloud-based server system and/or other type of computing system that can communicate with the vehicle computing system 105 of the vehicle 110 (and/or a user device). The operations computing system 115 can be implemented with an infrastructure (e.g., of the entity), as further described herein. The computing device(s) of the operations computing system 115 can include various components for performing various operations and functions. For instance, the computing device(s) can include one or more processor(s) and one or more tangible, non-transitory, computer readable media (e.g., memory devices, etc.). The one or more tangible, non-transitory, computer readable media can store instructions that when executed by the one or more processor(s) cause the operations computing system 115 (e.g., the one or more processors, etc.) to perform operations and functions, such as providing data to and/or obtaining data from the vehicle 110, for managing a fleet of vehicles (that includes the vehicle 110), etc.

The vehicle 110 incorporating the vehicle computing system 105 can be various types of vehicles. For instance, the vehicle 110 can be a ground-based autonomous vehicle such as an autonomous car, autonomous truck, autonomous bus, etc. The vehicle 110 can be an air-based autonomous vehicle (e.g., airplane, helicopter, or other aircraft) or other types of vehicles (e.g., watercraft, etc.). The vehicle 110 can be an autonomous vehicle that can drive, navigate, operate, etc. with minimal and/or no interaction from a human operator (e.g., driver). In some implementations, a human operator can be omitted from the vehicle 110 (and/or also omitted from remote control of the vehicle 110). In some implementations, a human operator can be included in the vehicle 110.

In some implementations, the vehicle 110 can be configured to operate in a plurality of operating modes. The vehicle 110 can be configured to operate in a fully autonomous (e.g., self-driving) operating mode in which the vehicle 110 is controllable without user input (e.g., can drive and navigate with no input from a human operator present in the vehicle 110 and/or remote from the vehicle 110). The vehicle 110 can operate in a semi-autonomous operating mode in which the vehicle 110 can operate with some input from a human operator present in the vehicle 110 (and/or a human operator that is remote from the vehicle 110). The vehicle 110 can enter into a manual operating mode in which the vehicle 110 is fully controllable by a human operator (e.g., human driver, pilot, etc.) and can be prohibited and/or disabled (e.g., temporary, permanently, etc.) from performing autonomous navigation (e.g., autonomous driving). In some implementations, the vehicle 110 can implement vehicle operating assistance technology (e.g., collision mitigation system, power assist steering, etc.) while in the manual operating mode to help assist the human operator of the vehicle 110.

The operating modes of the vehicle 110 can be stored in a memory onboard the vehicle 110. For example, the operating modes can be defined by an operating mode data structure (e.g., rule, list, table, etc.) that indicates one or more operating parameters for the vehicle 110, while in the particular operating mode. For example, an operating mode data structure can indicate that the vehicle 110 is to autonomously plan its motion when in the fully autonomous operating mode. The vehicle computing system 105 can access the memory when implementing an operating mode.

The operating mode of the vehicle 110 can be adjusted in a variety of manners. In some implementations, the operating mode of the vehicle 110 can be selected remotely, off-board the vehicle 110. For example, an entity associated with the vehicle 110 (e.g., a service provider) can utilize the operations computing system 115 to manage the vehicle 110 (and/or an associated fleet). The operations computing system 115 can send data to the vehicle 110 instructing the vehicle 110 to enter into, exit from, maintain, etc. an operating mode. By way of example, the operations computing system 115 can send data to the vehicle 110 instructing the vehicle 110 to enter into the fully autonomous operating mode. In some implementations, the operating mode of the vehicle 110 can be set onboard and/or near the vehicle 110. For example, the vehicle computing system 105 can automatically determine when and where the vehicle 110 is to enter, change, maintain, etc. a particular operating mode (e.g., without user input). Additionally, or alternatively, the operating mode of the vehicle 110 can be manually selected via one or more interfaces located onboard the vehicle 110 (e.g., key switch, button, etc.) and/or associated with a computing device proximate to the vehicle 110 (e.g., a tablet operated by authorized personnel located near the vehicle 110). In some implementations, the operating mode of the vehicle 110 can be adjusted by manipulating a series of interfaces in a particular order to cause the vehicle 110 to enter into a particular operating mode.

The vehicle computing system 105 can include one or more computing devices located onboard the vehicle 110. For example, the computing device(s) can be located on and/or within the vehicle 110. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 110 (e.g., its computing system, one or more processors, etc.) to perform operations and functions, such as those described herein for determining object motion, controlling vehicle motion, etc.

The vehicle 110 can include a communications system 125 configured to allow the vehicle computing system 105 (and its computing device(s)) to communicate with other computing devices. The vehicle computing system 105 can use the communications system 125 to communicate with the operations computing system 115 and/or one or more other computing device(s) over one or more networks (e.g., via one or more wireless signal connections). For example, the vehicle computing system 105 can utilize the communications system to communicate with one or more system clients that are remote from the vehicle 110 via a telecommunications network system, as further described herein. In some implementations, the communications system 125 can allow communication among one or more of the system(s) on-board the vehicle 110. The communications system 125 can include any suitable components for interfacing with one or more network(s), including, for example, transmitters, receivers, ports, controllers, antennas, and/or other suitable components that can help facilitate communication.

As shown in FIG. 1, the vehicle 110 can include one or more vehicle sensors 130, an autonomy computing system 135, one or more vehicle control systems 140, and other systems, as described herein. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel.

The vehicle sensor(s) 130 can be configured to acquire sensor data 145 associated with one or more objects that are within the surrounding environment of the vehicle 110. For instance, the sensor data 145 can be acquired for object(s) that are within a field of view of one or more of the vehicle sensor(s) 130. The vehicle sensor(s) 130 can include a Light Detection and Ranging (LIDAR) system, a Radio Detection and Ranging (RADAR) system, one or more cameras (e.g., visible spectrum cameras, infrared cameras, etc.), motion sensors, and/or other types of imaging capture devices and/or sensors. The sensor data 145 can include image data, RADAR data, LIDAR data, and/or other data acquired by the vehicle sensor(s) 130. The object(s) can include, for example, vehicles, pedestrians, bicycles, and/or other objects. The object(s) can be located in front of, to the rear of, to the side of the vehicle 110, etc. The sensor data 145 can be indicative of locations associated with the object(s) within the surrounding environment of the vehicle 110 at one or more times. The vehicle sensor(s) 130 can provide the sensor data 145 to the autonomy computing system 135.

In addition to the sensor data 145, the autonomy computing system 135 can retrieve or otherwise obtain map data 150. The map data 150 can provide detailed information about the surrounding environment of the vehicle 110. For example, the map data 150 can provide information regarding: the identity and location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); the location of obstructions (e.g., roadwork, accidents, etc.); data indicative of events (e.g., scheduled concerts, parades, etc.); and/or any other map data that provides information that assists the vehicle 110 in comprehending and perceiving its surrounding environment and its relationship thereto. In some implementations, the vehicle computing system 105 can determine a vehicle route for the vehicle 110 based at least in part on the map data 150.

The vehicle 110 can include a positioning system 155. The positioning system 155 can determine a current position of the vehicle 110. The positioning system 155 can be any device or circuitry for analyzing the position of the vehicle 110. For example, the positioning system 155 can determine position by using one or more of inertial sensors (e.g., inertial measurement unit(s), etc.), a satellite positioning system, based on IP address, by using triangulation and/or proximity to network access points or other network components (e.g., cellular towers, WiFi access points, etc.) and/or other suitable techniques. The position of the vehicle 110 can be used by various systems of the vehicle computing system 105 and/or provided to a remote computing device (e.g., of the operations computing system 115). For example, the map data 150 can provide the vehicle 110 relative positions of the surrounding environment of the vehicle 104. The vehicle 110 can identify its position within the surrounding environment (e.g., across six axes) based at least in part on the data described herein. For example, the vehicle 110 can process the vehicle sensor data 145 (e.g., LIDAR data, camera data) to match it to a map of the surrounding environment to get an understanding of the vehicle's position within that environment.

The autonomy computing system 135 can include a perception system 160, a prediction system 165, a motion planning system 170, and/or other systems that cooperate to perceive the surrounding environment of the vehicle 110 and determine a motion plan for controlling the motion of the vehicle 110 accordingly. For example, the autonomy computing system 135 can obtain the sensor data 145 from the vehicle sensor(s) 130, attempt to comprehend the surrounding environment by performing various processing techniques on the sensor data 145 (and/or other data), and generate an appropriate motion plan through such surrounding environment. The autonomy computing system 135 can control the one or more vehicle control systems 140 to operate the vehicle 110 according to the motion plan.

The vehicle computing system 105 (e.g., the autonomy system 135) can identify one or more objects that are proximate to the vehicle 110 based at least in part on the sensor data 145 and/or the map data 150. For example, the vehicle computing system 105 (e.g., the perception system 160) can process the sensor data 145, the map data 150, etc. to obtain perception data 175. The vehicle computing system 105 can generate perception data 175 that is indicative of one or more states (e.g., current and/or past state(s)) of a plurality of objects that are within a surrounding environment of the vehicle 110. For example, the perception data 175 for each object can describe (e.g., for a given time, time period) an estimate of the object's: current and/or past location (also referred to as position); current and/or past speed/velocity; current and/or past acceleration; current and/or past heading; current and/or past orientation; size/footprint (e.g., as represented by a bounding shape); class (e.g., pedestrian class vs. vehicle class vs. bicycle class), the uncertainties associated therewith, and/or other state information. The perception system 160 can provide the perception data 175 to the prediction system 165 (and/or the motion planning system 170).

The prediction system 165 can be configured to predict a motion of the object(s) within the surrounding environment of the vehicle 110. For instance, the prediction system 165 can generate prediction data 180 associated with such object(s). The prediction data 180 can be indicative of one or more predicted future locations of each respective object. For example, the prediction system 180 can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of way points. In some implementations, the prediction data 180 can be indicative of the speed and/or acceleration at which the respective object is predicted to travel along its associated predicted motion trajectory. The predictions system 165 can output the prediction data 180 (e.g., indicative of one or more of the predicted motion trajectories) to the motion planning system 170.

The vehicle computing system 105 (e.g., the motion planning system 170) can determine a motion plan 185 for the vehicle 110 based at least in part on the perception data 175, the prediction data 180, and/or other data. A motion plan 185 can include vehicle actions (e.g., planned vehicle trajectories, speed(s), acceleration(s), other actions, etc.) with respect to one or more of the objects within the surrounding environment of the vehicle 110, as well as the objects' predicted movements. For instance, the motion planning system 170 can implement an optimization algorithm, model, etc. that considers cost data associated with a vehicle action as well as other objective functions (e.g., cost functions based on speed limits, traffic lights, etc.), if any, to determine optimized variables that make up the motion plan 185. The motion planning system 170 can determine that the vehicle 110 can perform a certain action (e.g., pass an object) without increasing the potential risk to the vehicle 110 and/or violating any traffic laws (e.g., speed limits, lane boundaries, signage, etc.). For instance, the motion planning system 170 can evaluate one or more of the predicted motion trajectories of one or more objects during its cost data analysis as it determines an optimized vehicle trajectory through the surrounding environment. The motion planning system 170 can generate cost data associated with such trajectories. In some implementations, one or more of the predicted motion trajectories may not ultimately change the motion of the vehicle 110 (e.g., due to an overriding factor such as a jaywalking pedestrian). In some implementations, the motion plan 185 may define the vehicle's motion such that the vehicle 110 avoids the object(s), reduces speed to give more leeway one or more of the object(s), proceeds cautiously, performs a stopping action, etc.

The motion planning system 170 can be configured to continuously update the vehicle's motion plan 185 and a corresponding planned vehicle motion trajectory. For example, in some implementations, the motion planning system 170 can generate new motion plan(s) 185 for the vehicle 110 (e.g., multiple times per second). Each new motion plan can describe motion of the vehicle 110 over the next planning period (e.g., next several seconds). Moreover, a new motion plan may include a new planned vehicle motion trajectory. Thus, in some implementations, the motion planning system 170 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 110.

The vehicle computing system 105 can cause the vehicle 110 to initiate a motion control in accordance with at least a portion of the motion plan 185. For instance, the motion plan 185 can be provided to the vehicle control system(s) 140 of the vehicle 110. The vehicle control system(s) 140 can be associated with a vehicle controller (e.g., including a vehicle interface) that is configured to implement the motion plan 185. The vehicle controller can, for example, translate the motion plan into instructions for the appropriate vehicle control component (e.g., acceleration control, brake control, steering control, etc.). By way of example, the vehicle controller can translate a determined motion plan 185 into instructions to adjust the steering of the vehicle 110 "X" degrees, apply a certain magnitude of braking force, etc. The vehicle controller (e.g., the vehicle interface) can help facilitate the responsible vehicle control (e.g., braking control system, steering control system, acceleration control system, etc.) to execute the instructions and implement the motion plan 185 (e.g., by sending control signal(s), making the translated plan available, etc.). This can allow the vehicle 110 to autonomously travel within the vehicle's surrounding environment.

In some implementations, the vehicle 110 can include a human-machine interface system 190. The human-machine interface system 190 can be configured to allow interaction between a user (e.g., human), the vehicle 110 (e.g., the vehicle computing system 105), and/or a third party (e.g., an operator associated with the service provider). The human-machine interface system 190 can include a variety of hardware and/or software that allows a user to input and/or receive information. For example, the human-machine interface system 190 can include a user device (e.g., tablet, phone, laptop, gaming system, other user device, etc.) that includes one or more display devices (e.g., display screens, etc.). The human-machine interface system 190 can implement, for example, a graphical user interface, direct manipulation interface, web-based user interface, touch user interface, attentive user interface, conversational and/or voice interfaces (e.g., via text messages, chatter robot), conversational interface agent, interactive voice response (IVR) system, gesture interface, and/or other types of interfaces via the user device(s). The human-machine interface system 190 (e.g., the associated user device(s)) can include one or more input device(s) (e.g., touchscreens, keypad, touchpad, knobs, buttons, sliders, switches, mouse, gyroscope, microphone, other hardware interfaces) configured to receive user input. The human-machine interface system 190 (e.g., the associated user device(s)) can also include one or more output device(s) (e.g., display devices, speakers, lights, etc.) to configured to output data (e.g., visual content, audio content, haptic content, etc.).

As described herein, the vehicle 110 can communicate with one or more remote computing systems that are remote from the vehicle 110. For instance, the vehicle computing system 105 can utilize the communication system 125 to communicate with the operations computing system 115. The vehicle computing system 105 can provide various types of data to the operations computing system 115, via the communications system 125. In order to facilitate such communications, the operations computing system 115 can include an application programming interface 191.

The application programming interface 191 can be a distributed platform that enables integration between vehicles (e.g., entity vehicles, third party vehicles, vehicles associated with authorized vehicle providers, etc.) and services within the entity's infrastructure. The application programming interface 191 can be a distributed, composite system that includes "active", "passive", and/or "procedural" portions. For example, the application programming interface 191 can include interactive remote procedure call (e.g., gRPC. Etc/) and Kafka portions that can be "active", while the portions related to the mechanics of routing and/or proxying data traffic, cross-datacenter replication (as further described herein), can be passive. Moreover, the application programming interface 191 can offer Kafka topic(s) as a secondary application programming interface, and can use durable memory (e.g., datastores, etc.) for persistence.

The application programming interface 191 can allow the entity to normalize and abstract communications with vehicles. For example, the application programming interface 191 can include instructions that allow vehicles and/or other systems (e.g., the vehicle 110, other computing systems, etc.) and the one or more infrastructure endpoints (e.g., system clients, etc.) to efficiently communicate, as further described herein. The ability to inspect, orchestrate, aid, configure, and otherwise augment vehicles (and/or other systems) with a supporting off-board service infrastructure helps to further develop the capabilities of the entity's vehicles as well as those of third parties.

To help access the application programming interface 191, the vehicle computing system 105 can include a vehicle client 192. Data indicative of the vehicle client 192 can be provided to (e.g., sent to, downloaded to, made available to, etc.) to the vehicle computing system 105 by the operations computing system 115 (e.g., associated with the entity) and/or provided to another computing system that can then provide the vehicle client 192 to the vehicle computing system 105 and/or otherwise help implement the vehicle client 192 on the vehicle 110. The vehicle client 192 can be implemented via hardware and/or software onboard the vehicle 110, such that the vehicle computing system 105 can access the application programming interface 191 associated with the entity. This can allow the vehicle 110 to communicate with the back-end services of the entity (e.g., of system clients, etc.), regardless whether the vehicle 110 is or is not included in the fleet of the entity. In this way, the application programming interface 191 can be vehicle agnostic.

Additionally, or alternatively, a third party computing system 193 that is remote from the vehicle 110 can implement a client 194 that allows the third party computing system 193 to communicate with the operations computing system 115 of the entity and the back-end services associated therewith. For example, the third party computing system 193 can be associated with a third party that owns, leases, manufactures, etc. the vehicle 110 (e.g., a non-fleet vehicle), an authorized vehicle provider, and/or another type of entity. The client 194 can allow the third party system 193 to communicate with the operations computing system 115 to obtain data such as, for example, data indicative of the vehicle services provided by the vehicle 110, compensation data, etc.

The vehicle client 192 can be configured to allow the vehicle computing system 105 to generate a communication associated with the vehicle 110 that can be read and understood by an application programming gateway (API gateway) of the application programming interface 191. The API gateway can be associated with the entity and can be remote from the vehicle 110. The API gateway can be implemented by one or more computing devices of the operations computing system 115 that is remote from the vehicle 110. The vehicle computing system 105 can invoke, via the vehicle client 192, an application programming interface 191 to access a library 195 indicative of a plurality of parameters (e.g., P1, P2, etc.). The library 195 can include, for example, a central repository for parameters that can be used to generate a communication (e.g., message, query string, data set, etc.) to be sent to the API gateway. The parameters can be indicative of definitions (e.g., message definitions, query structures, data formats, etc.) that can be used by the vehicle computing system 105 to determine how to structure a communication such that the API gateway is able to properly route the communication and the appropriate system client is able to process the communication and return the appropriate data, if necessary/requested. For instance, using the vehicle client 192, the vehicle computing system 105 can access the library 195 associated with the application programming interface 191. The vehicle computing system 105 can generate a communication that indicates that the vehicle 110 is available to provide a vehicle service (e.g., to transport a user) based at least in part on the parameter(s) of the library 195. The vehicle computing system 105 can provide such a communication to the API gateway that is remote from the vehicle 110.

Figure 2:
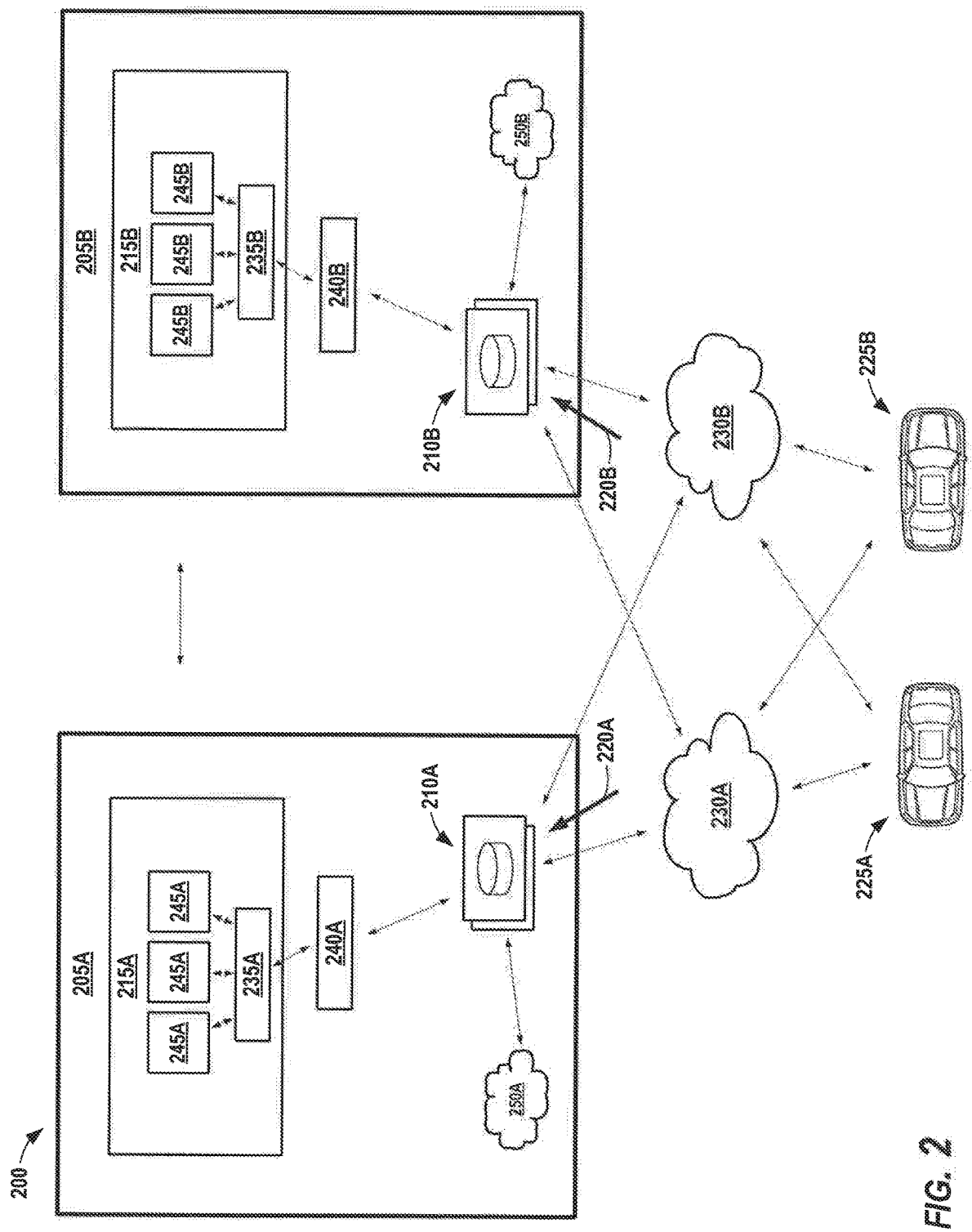
FIG. 2 depicts an example telecommunications network system according to example embodiments of the present disclosure.

The API gateway can be maintained in a telecommunications network system of the entity's infrastructure. For instance, FIG. 2 depicts an example telecommunications network system 200 according to example embodiments of the present disclosure. The telecommunications network system 200 can be a vehicle telecommunications network system (e.g., an autonomous vehicle telecommunications network system) that provides an infrastructure to facilitate communication between vehicle(s) (e.g., autonomous vehicle(s), etc.) and various computing systems that are remote from the vehicle(s). The telecommunications network system 200 can include one or more redundant regional operations computing systems 205A-B. Each regional operations computing system 205A-B can include the same or similar components and perform the same or similar operations and functions as the operations computing system 115.

Each of the operations computing systems 205A-B can be associated with a different geographic region. By way of example, the telecommunications network system 200 can include a first regional operations computing system 205A that is associated with the west coast of the United States and a second regional telecommunications system 205B that is associated with the east coast of the United States.

Each regional telecommunications system 205A-B can include a point-of-presence interface and a data center system. For instance, the telecommunications network system 200 (e.g., a first regional operations computing system 205A) can include a first point-of-presence interface 210A and a first data center 215A. In some implementations, the telecommunications network system 200 (e.g., the first operations computing system 205A) can include a first security system (not shown). The first point-of-presence interface 210A, the first data center system 215A, the first security system, and/or other portions of the first regional operations computing system 205A can be associated with a first geographic region. Additionally, or alternatively, the telecommunications network system 200 (e.g., the second regional operations computing system 205B) can include a second point-of-presence interface 210B and a second data center 215B. In some implementations, the telecommunications network system 200 (e.g., the second operations computing system 205B) can include a second security system (not shown). The second point-of-presence interface 210B, the second data center system 215B, the second security system, and/or other portions of the second regional operations computing system 205B can be associated with a second geographic region, that is different from the first geographic region.

A point-of-presence interface 210A-B can be configured to route the communications associated with a vehicle. For instance, the first point-of-presence interface 210A can be configured to obtain a first communication 220A associated with a first vehicle 225A and to route the first communication 220A associated with the first vehicle 225A. The first vehicle 225A can be located within the first geographic region. Additionally, or alternatively, the second point-of-presence interface 210B can be configured to obtain a second communication 220B associated with a second vehicle 225B and to route the second communication 220B associated with the second vehicle 225B. The second vehicle 225B can be located within the second geographic region. The first and second vehicles 225A-B can include the same or similar components and perform the same or similar operations and functions as the vehicle 104 (e.g., an autonomous vehicle).

A point-of-presence interface 210A-B can include various computing devices (e.g., servers, routers, switches, multiplexers, other network interface equipment, etc.) for routing communications. For example, a point-of-presence interface 210A-B can be a pass-through network that is simply configured for routing purposes. A point-of-presence interface 210A-B can obtain (e.g., directly, indirectly via other device/system, etc.) communications from the vehicle(s) 225A-B via a plurality of different networks 230A-B. The networks 230A-B can include, for example, various wireless networks (e.g., LTE networks, etc.) of different carriers and/or other types of networks. In some implementations, a point-of-presence interface 210A-B can route communications to a respective security system associated therewith, for authentication as well as to a recipient computing system (e.g., a data center system 215A-B, etc.).

The point-of-presence interface(s) 210A-B can be separate from the other computing systems in the telecommunications network system 200 (e.g., the systems of the respective regional operations computing system 205A-B). For instance, the first point-of-presence interface 210A can be separate from the first data center system 215A and/or the other systems of the first regional operations computing system 205A. The second point-of-presence interface 210B can be separate from the second data center system 215B and/or the other systems of the second regional operations computing system 205B. In some implementations, the point-of-presence interfaces 210A-B can be physically separate from these other systems (e.g., implemented via different computing devices and/or otherwise be separated from the hardware thereof, etc.). In some implementations, the point-of-presence interfaces 210A-B can be logically separate from these other systems (e.g., implemented via different hardware, firmware, software, etc. and/or than and/or otherwise be logically separated therefrom).

In some implementations, the point-of-presence interfaces 210A-B can route vehicle communications to associated security systems. A security system can include various systems and devices for authenticating the communications 220A-B associated with the vehicles 225A-B. For instance, a security system can include a key server, a vehicle domain name system (DNS) server (e.g., secure DNS server), and/or other computing device(s), which can authenticate data to allow the vehicle(s) 225A-B to communicate with the other systems of the telecommunications network system 200 (e.g., a data center system 215A-B). By way of example, a unique identifier, token, etc. can be stored onboard a vehicle 225A-B and can be provided to the security system so that the security system can identify that the vehicle 225A-B is part of an associated fleet and/or otherwise an authorized vehicle. As a result of a handshake process, the vehicle 225A-B can obtain a key that can allow the vehicle 225A-B to be authenticated for calling a vehicle application programming interface (API) gateway 235A-B of the respective data center system 215A-B. The vehicle API gateway 235A-B and the vehicle 225A-B can undergo a handshake procedure to determine one or more temporary keys to be used for a particular API session.

A data center system 215A-B can be configured to obtain communications associated with a vehicle 225A-B (e.g., authenticated communications) and/or provide data to a vehicle 225A-B. Communications can be directly routed to the data center system 215A-B (e.g., the associated API gateway 235A-B thereof) from the respective point-of-presence interface 210A-B and/or a via a proxy 240A-B.

An API gateway 235A-B of a data center system 215A-B can allow a vehicle 225A-B to create API sessions for communication with the respective data center system 215A-B. An API gateway 235A-B can be a logically consolidated point of ingress and egress for communications from and/or to a vehicle 225A-B and the respective system clients 245A-B of the particular data center system 215A-B (e.g., authenticated communications associated with the vehicles 225A-B). Moreover, an API gateway 235A-B can be a logical construct that contains vehicle and/or service facing interfaces, as further described herein with reference to FIG. 3.

An API gateway 235A-B can be configured to support the communications of vehicles within a particular geographic region. For instance, the first vehicle 225A can be located in a first geographic region. A portion of a telecommunications network system 200 (e.g., the first regional operations computing system 205A) can include the first API gateway 235A. The portion of the telecommunications network system 200 that includes the first API gateway 235A (e.g., the first regional operations computing system 205A) can be associated with the first geographic region. As such, the first API gateway 235A can typically obtain one or more first communications 220A from vehicles within the first geographic region. The second API gateway 235B can be configured in a similar manner, such that the second API gateway 235B can typically obtain one or more second communications 220B from vehicles within the second geographic region, unless there is an occurrence of a failover.

The point-of-presence interface(s) 210A-B can provide a failover process for the telecommunications network system 200. This can ensure that, for example, the data utilized for vehicle operation (e.g., map data), data generated by a vehicle (e.g., vehicle state data), as well other communications (e.g., distress calls) are still appropriately addressed in the event of a system failure. For example, as described herein, the telecommunications network system 200 can include multiple point-of-presence interfaces 210A-B (e.g., each associated with a particular geographic region). The first point-of-presence interface 210A can be further configured to obtain the one or more second communications 220B associated with the second vehicle(s) 225B (e.g., located in the second geographic region) when the second regional operations computing system 205B is unavailable. By way of example, in the event that the second regional operations computing system 205B is unavailable (e.g., due to point-of-presence interface, proxy, data center system, and/or other hardware/software failure, system maintenance, unreachable due to communication error, etc.), the networks 230A-B can provide the second communication(s) 220B to the first point-of-presence interface 210A. The first point-of-presence interface 210A can route the second communication(s) 220B (e.g., from vehicles within the second geographic region) to the systems of the first regional operations computing system 205A (e.g., the first data center 215A, the first API gateway 235A, etc.). In some implementations, the data traffic from one geographic region can be route to the nearest responsive data center system.

Additionally, or alternatively, the second point-of-presence interface 210B can be further configured to obtain the first communication(s) 220A associated with the first vehicle(s) 225A when the first regional operations computing system 205A is unavailable. By way of example, in the event that first regional operations computing system 205A is unavailable due to point-of-presence interface, proxy, data center system, and/or other hardware/software failure, system maintenance, unreachable due to communication error, etc.), the networks 230A-B can provide the first communication(s) 220A to the second point-of-presence interface 210B. The second point-of-presence interface 210B can route the first communication(s) 220A (e.g., from vehicles within the first geographic region) to the systems of the second regional operations computing system 205B (e.g., the second data center 215B, the second API gateway 235B, etc.).

In some implementations, to help allow a regional operations computing system 205A-B from another geographic region to address the communications and data needs of vehicles within another geographic region, the data storage, system clients 245A-B, API portions (e.g., Kafka, etc.) of the different regional operations computing system 205A-B can be replicated across data center systems 215A-B. Such replication may still be available during some failure events (e.g., during a proxy failure) and may not be available during other failure events (e.g., during a data center system failure). The redundant regional telecommunications system can allow the telecommunications network system 200 to be tolerant of degradation and failure, while providing automatic failover capabilities in the event of a problem with one of the regional operations computing systems 205A-B.

In some implementations, the telecommunications network system 200 can provide a vehicle 225A-B with access to a public network 250A-B, such as a public internet network. For example, the first point-of-presence interface 210A can be configured to allow the first vehicle 225A to access a first public network 250A (e.g., a public internet network). Additionally, or alternatively, the second point-of-presence interface 210B can be configured to allow the second vehicle 225B to access a second public network 250B (e.g., a public internet network). Connectivity from a vehicle 225A-B to a public network 250A-B can either be direct (e.g., routed via a point-of-presence interface 210A-B) and/or controlled by looping public network traffic through vehicle API administered networks within the respective data center systems 215A-B. Use of a public network 250A-B can allow a user of a vehicle 225A-B to utilize a variety of third party services. For instance, a human-machine interface system (e.g., tablet, gaming system, etc.) onboard a vehicle 225A-B can allow a user to utilize various software applications (e.g., while riding in the vehicle for a transportation service). The software applications can utilize a public network 250A-B to provide the various third party services to the user. For example, a human-machine interface system may allow a user to utilize a video streaming service. In the event that a software application associated with the video streaming service is launched (e.g., on a user device upon user input selection), the vehicle 225A-B can send a communication to a point-of-presence interface 210A-B to allow the human-machine interface system to access a public network 250A-B so that the user can stream visual content (e.g., movies, TV shows, etc.) while in the vehicle 225A-B. In another example, when a gaming software application is launched, the human-machine interface system can access a public internet network 250A-B via a point-of-presence interface 210A-B to allow a user to play a game via a public internet network 250A-B (e.g., with users of other vehicles).

Figure 3:
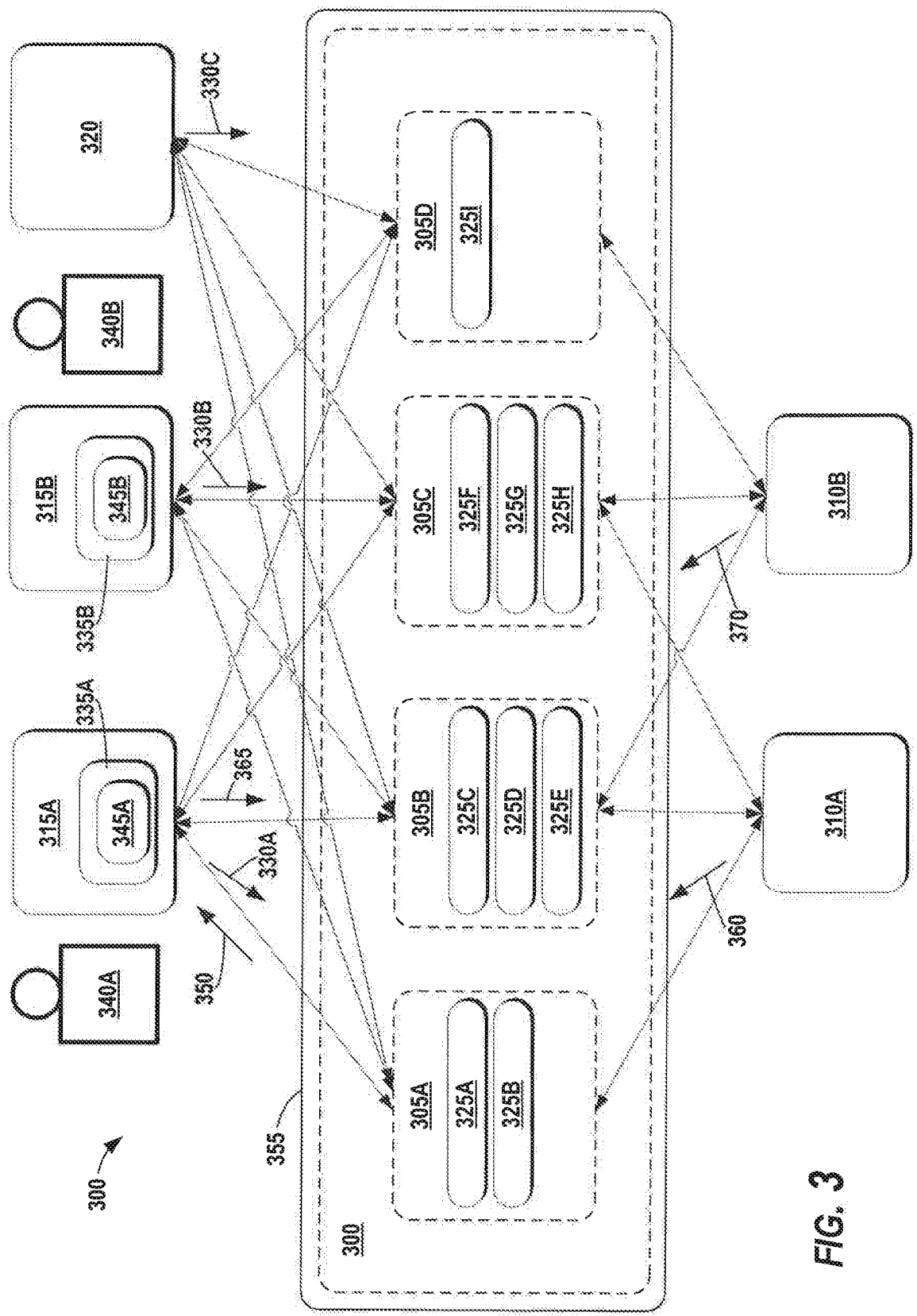
FIG. 3 depicts an example application programming interface gateway according to example embodiments of the present disclosure.

FIG. 3 depicts an example API gateway 300 according to example embodiments of the present disclosure. The API gateways 235A-B of the telecommunications system 200 can be the API gateway 300 and/or otherwise include the same or similar components and perform the same or similar operations and functions as the API gateway 300. An operations computing system 355 can include the API gateway 300 and can be configured to perform the operations and functions of the API gateway 300. The operations computing system 355 can include the same or similar components and perform the same or similar operations and functions as the operations computing systems described herein (e.g., 106, 250A-B).

The API gateway 300 can help facilitate the communications with one or more vehicles 315A-B and/or a third party computing system 320. The vehicle(s) 315A-B can include the same or similar components and perform the same or similar operations and functions as the vehicles 104, 225A-B (e.g., an autonomous vehicle). The vehicle(s) 315A-B can be included in a fleet of the entity associated with the API gateway 300, not included in a fleet of the entity associated with the API gateway (e.g., belonging to a third party), and/or associated with an authorized vehicle provider. The third party computing system 320 can include the same or similar components and perform the same or similar operations and functions as the third party computing systems described herein (e.g., 193).

The API gateway 300 can be a logical construct that contains vehicle and/or other system facing interfaces. For example, the API gateway 300 can include a plurality of frontend interfaces 305A-D. Each frontend interface 305A-D can be associated with one or more system clients 310A-B. A system client 310A-B can be the hardware and/or software implemented on the operations computing system (e.g., of the entity) that is remote from a vehicle 315A-B and/or a third party computing system 320 (e.g., associated with the vehicle(s) 315A-B, etc.) and that provides a particular back-end service (e.g., isolated, abstracted back-end service, etc.) to a vehicle 315A-B and/or third party computing system 320. A frontend interface 305A-D can be the interface (e.g., a normalized interface, etc.) that allows one application and/or system (e.g., of a vehicle 315A-B, third party computing system 320, etc.) to provide data to and/or obtain data from another application and/or system (e.g., a system client 310A-B). Each frontend interface 305A-D can have one or more functions 325A-I that are associated with the particular frontend interface 305A-D. The vehicle 315A-B and/or the third party computing system 320 can provide a communication 330A-C to the API gateway 300 to call a function 325-A-I of a frontend interface 305A-B. In this way, the frontend interfaces 305A-D can be an external facing edge of the entity infrastructure that is responsible for providing a secure tunnel for a vehicle 315A-B and/or other system (e.g., third party computing system 320, etc.) to communicate with a particular system client 310A-B so that the vehicle 315A-B and/or other system can provide data to a system client 310A-B and/or the system client 310A-B can provide data to the vehicle 315A-B and/or other system. Moreover, the frontend interfaces 305A-B and system clients 310A-B can allow arbitrary services to build on top of, and to fully leverage the capabilities of, the underlying operations computing system 355.

The system 300 can include mutual authentication between the different components shown in FIG. 3. For example, the API gateway 300 can be configured to authenticate communications from the vehicles 315A-B, the third party computing system 320, and the system clients 310A-B (e.g., via the frontend interfaces 305A-D as further described herein). The vehicles 315A-B, the third party system 320, and the system clients 310A-B can be configured to authenticate the API gateway 300. One or more of these components can utilize secure connections (e.g., via TLS with certificate pinning, etc.), trusted message brokering (e.g., via message signatures, UUIDs, validity windows, etc.), traceable messages (e.g., via application tracing, etc.), and/or other security techniques. In some implementations, as described herein, key pairs can be assigned and distributed appropriately to each of these components. For example, each of the API gateway 300, vehicles 315A-B, third party system 320, system clients 310A-B can include a discrete key and/or other identifier. In some implementations, as described herein, an authorized vehicle provider can be assigned a key and/or other identifier that can be used for its associated vehicles and/or utilize a root-trust bundle.

The API gateway 300 can include a variety of different frontend interfaces 305A-D to accommodate for the various different system clients 310A-D of the operations computing system 355. For example, the frontend interfaces 305A-D can include a base frontend interface. The base frontend interface can be associated with a system client that provides a telemetry data service. The base frontend interface can be an interface between a vehicle 315A-B and/or the third party system 320 and, at least, the telemetry system client. For instance, the base frontend interface can be utilized by a vehicle 315A-B and the associated telemetry system client to provide/obtain vehicle state data. The vehicle state data can include information about the past, present, and/or future state of the vehicle 315A-B, a geospatial state representation of the vehicle 315A-B, environmental qualifiers, and/or other information. For example, the vehicle state data can be indicative of a vehicle's past, current, or future (planned): global and/or relative location (also referred to as position or pose); commanded and/or actual speed (also referred to as velocity); acceleration, heading; orientation; wheel position; operating mode; route of the vehicle; vehicle trajectory; sub-map entry point guides; objects detected within the vehicle's surrounding environment (e.g., the bounding shapes associated therewith, etc.); stop lines and/or objects to be queued/stopped for; vehicle diagnostic data; other data for modeling vehicle state, etc. Such vehicle state data can be provided by a vehicle 315A-B at regular intervals, on-demand, when requested, etc. In some implementations, a vehicle 315A-B may not report some intermediate vehicle state data to minimize latency and bandwidth utilization.

The base frontend interface can be configured to provide an interface by which a vehicle computing system 335A-B of a vehicle 315A-B can provide such vehicle state data to the telemetry system client and/or the telemetry system client can provide a set of data to the vehicle 315A-B (e.g., a request for vehicle state data). For example, the base frontend interface can be associated with a "report state" function which the vehicle 315A-B can call (e.g., via a communication 330A-B) to report the vehicle state data to the telemetry system client. In some implementations, a based frontend interface can be associated with one or more other system clients that are different than a telemetry system client and that are interested in such vehicle state data.

In the event that the third party computing system 120 has obtained vehicle state data, the third party computing system 120 may provide such data to a telemetry system client (and/or other interested system client) via the base frontend interface in a similar manner to that described herein.

In some implementations, the base frontend interface can include and/or provide communications to a vehicle state manager. The vehicle state manager can be configured to maintain a record of the most recent vehicle state data and propagate such information (e.g., to interested system clients). By way of example, the vehicle state manager can obtain vehicle state data indicative of a current position of a vehicle 315A-B and/or a current route of the vehicle 315A-B. The vehicle state manager can determine whether this reported vehicle state data is new (in comparison to past vehicle state data). In the event that the vehicle state data is new, the vehicle state manager can update its record and propagate the updated vehicle state data to one or more system clients 310A-B such as, for example, a telemetry system client.

In some implementations, the frontend interfaces 305A-D can include a fleet-specific frontend interface. The fleet-specific frontend interface can be associated with a system client that processes, analyzes, manages, etc. data that is specific to the fleet of the entity. The fleet-specific frontend interface can provide an interface between the vehicles (of the entity's fleet) and such a fleet-specific system client. For instance, the fleet-specific frontend interface can be utilized by a vehicle and the fleet-specific system client to obtain and provide fleet-specific vehicle data. The fleet-specific vehicle data can include, for example, a relative vehicle position (pose) estimate that is defined relative to one or more points-of-interest identified by the entity, certain map-based configurations of the vehicle, specific vehicle log metadata that may be of interest to the entity and/or only available via the vehicles of the entity's fleet, vehicle constraints specific to the entity's fleet, certain fleet vehicle metrics/events/structured logs, and/or other information. The fleet-specific frontend interface can be configured to provide an interface by which a vehicle computing system 335A-B can provide such fleet-specific vehicle data to the fleet-specific system client and/or the fleet-specific system client can provide data to the vehicle computing system 335A-B. For example, the fleet-specific frontend interface can be associated with a "Report Map Configuration" function which a vehicle computing system 335A-B can call (e.g., via a communication 330A-B) to report certain fleet specific map-based configurations to a fleet-specific frontend interface.

In some implementations, portions of the application programming interface 191 such as the fleet-specific frontend interface, library parameters associated with fleet-specific data, etc. may be unavailable (e.g., not published, restricted, etc.) to vehicles that are not included in the entity's fleet. For example, the API gateway 300 can utilize an access control list (ACL) and/or other access control procedure(s) to determine whether a vehicle 315A-B is permitted to access fleet-specific portions of the library and/or the fleet-specific frontend interface. This can prevent vehicles that are not included in the entity's fleet from communicating with a fleet-specific system client.

In some implementations, the frontend interfaces 305A-D can include an assistance frontend interface. The assistance frontend interface can be associated with a system client that provides assistance to a vehicle 315A-B and/or a user 340A-B of the vehicle 315A-B. The assistance frontend interface can be an interface between a vehicle 315A-B and, at least, the assistance system client. For instance, the assistance frontend interface can include an "Assistance Request" function which a vehicle computing system 335A-B of a vehicle 315A-B and/or a human-machine interface (e.g., 190) onboard the vehicle 315A-B the can call (e.g., via a communication 330A-B) to request assistance. In this way, the assistance frontend interface can allow the vehicle 315A-B and/or a human-machine interface onboard the vehicle 315A-B (e.g., a user device) to request assistance from the assistance system client. A request for assistance of the vehicle 315A-B can include, for example, a request for a remote computing system and/or a human operator to take control of the vehicle 315A-B from a remote location, a request for a human operator to contact a user 340A-B of the vehicle 315A-B (e.g., to address a user-related issue), and/or other information. In some implementations, an assistance frontend interface can be associated with one or more other system clients that are different than the assistance system client and that may be interested in such vehicle state data.

In the event that the third party computing system 120 has obtained data indicating that a vehicle 315A-B (and/or an associated user 340A-B) needs/requests assistance and/or data that would be helpful for providing assistance to a vehicle 315A-B, the third party computing system 120 may provide such data to an assistance system client (and/or other interested system client) via the assistance frontend interface in a similar manner to that described herein.

The assistance frontend interface can also, or alternatively, provide an interface for a vehicle 315A-B to provide data that can be used by the assistance system client and/or a human operator to help provide the appropriate assistance to the vehicle 315A-B. For example, the assistance frontend interface can allow the assistance system client to obtain streaming real-time data from a vehicle (or at least near real-time data, accounting for transmission and/or processing delays). This can include a live stream of sensor data (e.g., data from onboard camera, LIDAR, RADAR, etc.) and/or other telemetry data (e.g., using WebRTC, UDP, TCP, etc.).

The assistance frontend interface can also provide an interface for the assistance system client to provide data to assist the vehicle 315A-B and/or a user 340A-B of the vehicle 315A-B. For example, an assistance system client can provide, via the assistance frontend interface, a set of data that includes one or more control signals to control the motion of the vehicle 315A-B (e.g., by a human operator) from a location that is remote from the vehicle 315A-B. Additionally, or alternatively, the assistance system can provide, via the assistance frontend interface, one or more messages to appear on a human-machine interface of the vehicle 225A-B, a user device of a user 340A-B, and/or establish a live video and/or audio communication with the user 340A-B. In some implementations, the assistance system client can obtain communications via a different frontend interface. For example, the assistance system client may obtain vehicle state data via the base frontend interface. Such vehicle state data may help the assistance system client (and/or a human operator) provide assistance to a vehicle 315A-B and/or user 340A-B.

In some implementations, the frontend interfaces 305A-D can include a vehicle service frontend interface. The vehicle service frontend interface can be associated with a system client that helps coordinate the provision of vehicle services by a vehicle 315A-B. As described herein, the vehicle services can include, for example, transportation services, delivery services, courier services, etc. The vehicle service interface can be an interface between a vehicle 315A-B and, at least, the vehicle service system client. For instance, the vehicle service interface can be utilized by a vehicle 315A-B and the vehicle service system client to obtain and/or provide vehicle service data. The vehicle service data can include, for example, data indicating that a vehicle 315A-B is available to provide a vehicle service (e.g., data indicating that the vehicle is online, a request for a vehicle service assignment, an indication that the vehicle is not currently assigned to a vehicle service assignment, an indication that the vehicle will soon be available for an assignment, that an assignment will be/is ending, etc.), data indicating a vehicle service assignment for an vehicle 315A-B, data indicating an acceptance of a vehicle service assignment, data indicating a cancellation of a vehicle service assignment (e.g., by the vehicle, by a user, etc.), data indicating that a vehicle service assignment is complete, and/or other information. The vehicle computing system 335A-B of a vehicle 315A-B can call a function associated with the vehicle service frontend interface (e.g., "Get Assignment" function, "Accept Assignment" function, "Cancel Assignment" function, "Suggest Change" function, etc.) to communicate with the vehicle system client. In some implementations, a vehicle service frontend interface can be associated with one or more other system clients that are different than vehicle service system client and that may be interested in such vehicle service data.

In some implementations, the vehicle service interface can allow the vehicle service system client to provide a set of data indicative of an origin location (e.g., pick-up location for user and/or item, etc.), a destination location (e.g., drop-off/delivery location for user and/or item, etc.), a set of data indicative of a route that the vehicle is to follow (or suggested to follow) for the particular vehicle service assignment, and/or other parameters for a vehicle service assignment. In some implementations, the vehicle computing system 335A-B of a vehicle 315A-B can provide a revised and/or suggested vehicle service assignment parameter to the vehicle service system client via the vehicle service frontend interface. For example, a third party vehicle may provide a communication to the vehicle service system client, via the vehicle service frontend interface, that includes a suggestion for a different origin location, destination location, route, etc. The vehicle service system client can provide a set of data accepting, denying, etc. such a suggestion.

In the event that the third party computing system 120 has obtained data associated with the provision of a vehicle service (e.g., data indicative of a vehicle's availability to transport a user, suggested location data, etc.) and/or helps coordinate the provision of vehicles services by a vehicle 315A-B, the third party computing system 120 may provide data to a vehicle service system client (and/or other interested system client) via the vehicle service frontend interface and/or obtain data therefrom, in a similar manner to that described herein.

In some implementations, the frontend interfaces 305A-D can include a compensation frontend interface. The compensation frontend interface can be associated with a system client that coordinates compensation for vehicle services rendered by a vehicle 315A-B. The compensation frontend interface can be an interface between a vehicle 315A-B and/or a third party computing system 320 (e.g., of a third party entity that is associated with a non-fleet vehicle) and the compensation system client. A vehicle 315A-B and/or a third party computing system 320 can provide, via the compensation frontend interface, a request for compensation associated with a vehicle service provided by a vehicle 315A-B. For example, the vehicle 315A-B can provide a communication 330A-B to call a "Process Compensation" function of the compensation frontend interface. The compensation system client can obtain such a communication via the compensation frontend interface (e.g., the "Process Compensation" function). The compensation system client can be configured to process compensation for the vehicle 315A-B and/or the third party computing system 320 and/or facilitate such processing (e.g., by communicating with another computing system of a financial related entity, etc.). The compensation system client can provide, via the compensation frontend interface, a set of data associated with the compensation. This set of data can include, for example, a transfer of compensation, a confirmation that compensation has been transferred to an appropriate account, an indication that the compensation will be transferred and/or that the transfer is pending, and/or other information. In this way, the compensation frontend interface can provide a secure, dedicated tunnel for requesting and receiving compensation and/or a confirmation associated therewith.

In some implementations, the frontend interfaces 305A-D can include a user interface (UI) frontend interface. The UI frontend interface can be associated with a system client that manages the design, function, etc. of a user interface to be displayed via a display device onboard the vehicle 315A-B (e.g., of a human-machine interface, etc.). The UI frontend interface can be an interface between a vehicle 315A-B (e.g., a vehicle included in the entity's fleet, a vehicle not included in the entity's fleet, etc.) and the UI system client. The vehicle computing system 335A-B of the vehicle 315A-B can provide, via the UI frontend interface, a communication that requests data indicative of the user interface and the UI system client can provide, via the UI frontend interface, data indicative of the user interface. In this way, the entity can control the user interface to be displayed to users 340A-B of a vehicle 315A-B.

Figure 4B:
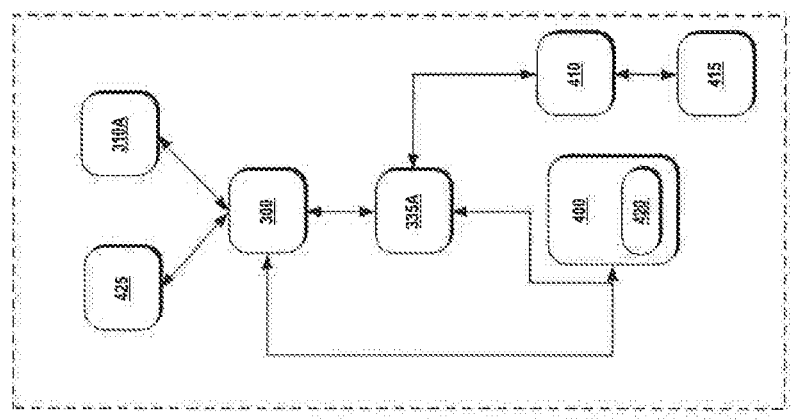
FIGS. 4A-B depict example implementations of a human-machine interface system according to example embodiments of the present disclosure.
Figure 4A:
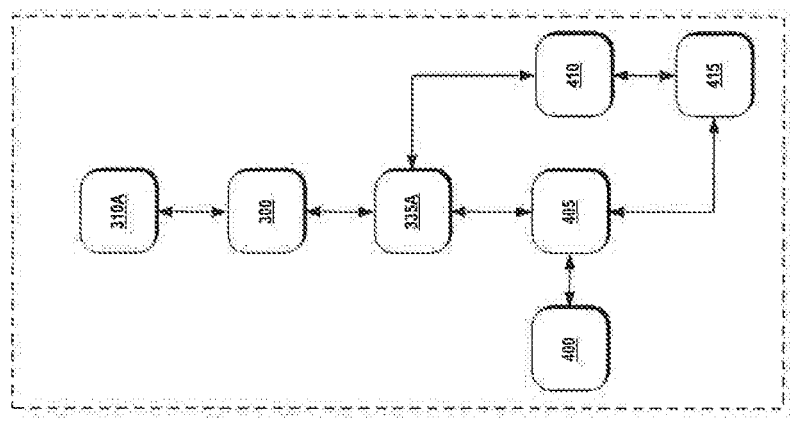

In some implementations, the human-machine interface system of a vehicle 315A-B can be configured to communicate with the onboard vehicle computing system of the vehicle 335A-B and/or the system client(s) 310A-B. FIGS. 4A-B depict example implementations of a human-machine interface system 400 according to example embodiments of the present disclosure. The human-machine interface system 400 can be included in the vehicle(s) 315A-B. The human-machine interface 400 can include the same or similar components and perform the same or similar operations and functions as the human-machine interface system 190.

As described herein, a human-machine interface system 400 of the vehicle 315A-B can include, for example, a user device (e.g., tablet, laptop, gaming system, etc.) located onboard the vehicle 315A-B and/or other device(s) (e.g., speakers, etc.) that can provide information to a user 340A-B (shown in FIG. 3). A user 340A-B of the vehicle 315A-B can utilize the human-machine interface system 400 (e.g., provide input to a tablet, view a display device, listen to audio content over the speakers, etc.) while the user 340A-B is within the vehicle 315A-B (e.g., while riding for a transportation service, retrieving an item, placing an item into the vehicle, etc.). To help improve the user's experience while using the vehicle 315A-B, the human-machine interface system 400 can obtain data for presentation to the user 340A-B and/or to be used to influence the user's experience.

In some implementations, the human-machine interface system 400 can obtain data from an onboard vehicle computing system, such as, for example, vehicle computing system 335A. For instance, with reference to FIG. 4A, the human-machine interface system 400 can communicate with an onboard user experience (UEX) interface 405. The onboard UEX interface 405 can allow the human-machine interface system 400 to communicate with the vehicle computing system 335A of the vehicle 315A as well as one or more other onboard software application(s) 410 (via a language 415 such as XIS, etc.). The human-machine interface system 400 can request, obtain, and/or provide data to and/or from the vehicle computing system 335A. The vehicle computing system 335A can be configured to obtain and/or provide data to, for example, a system client 310A via the API gateway 300, as described herein. In this way, the human-machine interface system 400 can obtain and/or provide data through the vehicle's onboard vehicle computing system 335A.

Additionally, or alternatively, the infrastructure for the data to be utilized by a human-machine interface 400 can be located off-board the vehicle 315A via one or more system clients. The human-machine interface 400 can communicate with the API gateway 300, without having to use the vehicle computing system 335A as an intermediary. For instance, with reference to FIG. 4B, a human-machine interface system 400 can include an human-machine interface (HMI) client 420 that allows the human-machine interface system 400 (e.g., tablet, etc.) to invoke an application programming interface (e.g., 191) and communicate with one or more system clients, via the API gateway 300. The HMI client 420 can allow the human-machine interface system 200 to generate communications for the API gateway 300 (e.g., based at least in part on gRPC, client definitions, etc.). These communications can be provided by the human-machine interface system 400 to the API gateway 300 in order to obtain data from a variety of system clients (e.g., via various frontend interfaces). For example, in some implementations, the human-machine interface system 400 may obtain vehicle state data from the telemetry system client, via the telemetry frontend interface. This can allow the human-machine interface system 400 to inform a user 340A of the current state of vehicle 315A (e.g., via a visual representation on a display device, via onboard speakers, etc.). Accordingly, the user 340A can understand that the vehicle 315A is operating correctly as well as perceiving objects within the surrounding environment. In another example, the human-machine interface system 400 may obtain user interface data from the UI system client, via the UI frontend interface (e.g., for display via a display device of a tablet). In another example, the human-machine interface system 400 may allow a user 340A to request assistance (e.g., by providing user input to a tablet) from the assistance system client, via the assistance frontend interface. In some implementations, the systems clients can include a dedicated user experience (UEX) system client 425 configured to obtain and/or provide data for communication to a user 340A (e.g., via the human-machine interface 400) and/or otherwise to enhance a user experience (e.g., news updates, weather information, estimate time to arrival, etc.). For example, the UEX system client can provide, via the API gateway 300, data associated with a user's profile and/or account to the human-machine interface system 400, which can present such information to a user 340A via a user interface on a display device. This can allow the user 340A to manage the user's account while riding in the vehicle 315A for a transportation service. By implementing the user experience service as a specific UEX system client 425, an application programming interface can allow a vehicle that is not included within the entity's fleet to more easily integrate with the entity infrastructure. Moreover, this can allow the entity to better control the user experience, leading to a more consistent and reliable user experience across both third party and fleet vehicles.

Returning to FIG. 3, in some implementations, the API gateway 300 can help facilitate the deployment of software to a vehicle 312A-B. For instance, one or more of the system clients 310A-B can be configured to provide one or more software deployments to the vehicles 315A. The software deployments can include, for example, data indicative of software updates, new software packages, troubleshooting/diagnostic software packages, debugging software, security-related software, and/or other software. Such software deployments can be handled by a dedicated system client and/or by a variety of system clients that provide software deployments associated with that system client's particular back-end service. For example, the UI system client can provide software deployments regarding the rendering of updated user interfaces.

The software deployments can be provided to a vehicle computing system 335A-B via a software deployment frontend interface and/or by the separate interfaces associated with each particular system client. The software deployments can be provided in response to a vehicle's request for such software and/or by a system client (without such request). By way of example, a vehicle 315A-B can travel to a maintenance location (e.g., service depot, etc.) when the vehicle 315A-B is not providing a vehicle service to a user 340A-B (e.g., in between providing transportation services). While at the maintenance location, the vehicle computing system 335A-B can connect to a wired network (e.g., with or without the assistance of a technician). The vehicle computing system 335A-B can provide a communication, via a frontend interface 305A-D of the API gateway 300, indicating to a system client 310A-B that the vehicle 315A-B is available for a software deployment (e.g., over the wired network). This can include, for example, a request for any software updates. One or more of the system clients 310A-B can provide, via one or more of the frontend interfaces 305A-D, one or more sets of data that include one or more software deployments to the vehicle 315A-B. In this way, the API gateway 300 can act as a conduit for deploying new and/or updated software to a vehicle 315A-B.

In some implementations, the application programming interface of the present disclosure can function as a relay that facilitates the communication of data (e.g., between a vehicle 315A-B/third party system 320 and a system client 310A-B) that is opaque to the application programming interface. Accordingly, the application programming interface can provide a mechanism through which a vehicle 315A-B (and/or the third party system 320) can make opaque requests and wait for a response from a system client 310A-B, or vice versa. For instance, a vehicle computing system 335A-B (and/or third party system 320) may want to utilize a functionality that is not explicitly provided by the API gateway 300 (and its frontend interfaces 305A-D). Such a communication can be used to wrap implementation-specific data into an opaque communication that can be provided to a system client 310A-B. Accordingly, the vehicle computing system 335A-B (and/or third party system 320) can wait for a response, if any. If a responsive set of data is available, it can be provided via the API gateway 300.

For instance, the application programming interface (associated with the API gateway 300) can be used to opaquely control software deployment in conjunction with off-board release/deployment services. A relayed remote procedure call (RPC) process can be used between the system clients 310A-B and a vehicle 315A-B to signal the start of a software deployment through the API gateway 300 without needing the application programming interface to understand the deployments. In some implementations, a RPC process can be utilized to allow the application programming interface to monitor what is being passed (bidirectionally), and as part of the evolution of the frontend interfaces, relevant opaque, service-level RPCs can be promoted into a concrete interface. This can help evolve the application programming interface overtime to accommodate for commonly communicated data.

The following provides an example for how a vehicle 315A can communicate with one or more system clients 310A-B via the API gateway 300. A similar such process can be utilized by a third party computing system 320 (a computing system that is remote from the vehicle 315A) to communicate with one or more system clients 310A-B via the API gateway 300.

The vehicle computing system 335A of the vehicle 315A (e.g., included in an entity's fleet or not included in the entity's fleet) can generate (e.g., via a vehicle client 345A) a first communication 330A associated with the vehicle 315A. The vehicle client 345A can be the same as or similar to the vehicle client 192 (of FIG. 1). As described herein, the first communication 330A (e.g., message, query string, other data, etc.) can be generated based on one or more parameters included in a library associated with an application programming interface (e.g., that includes the API gateway 300).

In some implementations, the first communication 330A can be generated in response to a request for data. For example, the vehicle computing system 335A can obtain from a system client 310A, via the API gateway, data 350 indicative of a request for data associated with the vehicle 315A. The vehicle computing system 335A can generate the first communication 330A associated with the vehicle 315A in response to the request for data. In some implementations, the first communication 330A can be generated to request data from a system client 310A-B, upload data (without a request for return data), and/or under other circumstances.

As described herein, the first communication 330A can include a variety of information The communication can include, for example, vehicle state data associated with the vehicle 315A, an indication that the vehicle 315A is available to provide a vehicle service, a request for compensation associated with a vehicle service provided by the vehicle 315A, a request for data associated with a user interface, a request for assistance of the vehicle 315A, an indication that the vehicle 315A is available for a software deployment, a request for data to be utilized by a human-machine interface 400, etc.

The vehicle computing system 335A can provide the first communication 330A to an API gateway 300 (e.g., that is remote from the vehicle 315A). This can include providing the first communication 330A directly and/or indirectly to the API gateway 300. The first communication 330A can be provided to the API gateway 300 (e.g., of a regional operations system 205A) associated with the same geographic region in which the vehicle 315A is located, and/or another region in the event of a failure event, as described herein.

The API gateway 300 can be configured to provide, via a first frontend interface 305A of a plurality of frontend interfaces 305A-D of the API gateway 300, the first communication 330A associated with the vehicle 315A to a first system client 310A of a plurality of system clients 310A-B. For instance, an operations computing system 355 can obtain, via the API gateway 300, the first communication 330A associated with the vehicle 315A. The operations computing system 355 (e.g., the API gateway 300) can determine at least a first frontend interface 305A of the API gateway 300 based at least in part on the first communication 330A associated with the vehicle 102. For example, the vehicle computing system 335A can structure the first communication 330A to include metadata (e.g., tag, identifier, etc.) that identifies a frontend interface (e.g., the first frontend interface 305A) and/or a system client. The API gateway 300 of the operations computing system 355 can process the communication to select the first frontend interface 305A based at least in part on the metadata. For example, the API gateway 300 can identify the first frontend interface 305A based at least in part on a tag and/or other metadata included in the first communication 330A that is indicative of the first frontend interface 305A. Additionally, or alternatively, the API gateway 300 can identify a system client 310A (e.g., a vehicle service system client) based at least in part on metadata included in the first communication 330A and/or the information included therein. The API gateway 300 can identify the first frontend interface 305A (e.g., a vehicle service frontend interface) as associated with the identified system client 310A.

The API gateway 300 can include internal logic that processes the communication and routes the first communication 330A to one or more frontend interfaces. In some implementations, this can include middleware that can route the first communication 330A based on heuristics and/or load. In some implementations, this can include dynamic routing of the first communication 330A where the first communication 330A is checked for validity and dropped in the event that it is invalid.

The operations computing system 355 (e.g., the API gateway 300) can provide, via a first frontend interface 305A, the first communication 330A associated with the vehicle 315A to a first system client 310A associated with the first frontend interface 305A. For instance, the first frontend interface 305A (e.g., a vehicle service frontend interface) can process the raw contents of the first communication 330A (e.g., requesting a vehicle service assignment) and buffer a series of data grams associated with the first communication 330A. The first frontend interface 305A can de-serialize the first communication 330A into a format that can be read by the first frontend interface 305A. In some implementations, the first frontend interface 305A can decrypt the first communication 330A in the event that it has been encrypted. Additionally, or alternatively, the frontend interface 305A can validate the first communication 330A associated with the vehicle 315A. This can include, for example confirming a signature in the event that the first communication 330A is signed cryptographically and/or other validation techniques to ensure that the communication is trusted and authorized to be provided to a system client. For example, a vehicle service frontend interface can process a communication requesting the vehicle service assignment to determine whether the communication is valid and associated with an authorized vehicle. If so, the communication can be provided to the vehicle service system client via the vehicle service frontend interface, which establishes a communication session between the vehicle 315A and the vehicle service system client. If not, the invalid communication can be dropped and/or queued for re-processing.

At least one system client 310A-D can obtain, via the first frontend interface 305A, the first communication 330A associated with the vehicle 315A. For example, a first system client 310A can obtain the first communication 330A associated with the vehicle 315A. The first system client 305A can determine whether a responsive set of data is necessary based at least in part on the first communication 330A. If not, the first system client 310A can store at least a portion of the first communication 330A in a local memory and/or provide the first communication 330A (and/or data included therein) for storage in a memory that is remote from the first system client 310A. By way of example, in the event that the first communication 330A includes vehicle state data (without a request for data), the first system client 310A (e.g., a telemetry system client) can store the vehicle state data without providing a return set of data and/or the first system client 305A can provide a receipt confirmation.

In the event that the first communication 330A includes a data request, at least one system client 310A-B can provide a set of data 360 to the vehicle 315A, via at least one frontend interface 305A-D. For example, the first system client 310A can be a vehicle service system client. The first system client 310A, via the first frontend interface 305A (e.g., a vehicle service frontend interface), can obtain the first communication 330A that includes, for example, a request for a vehicle service assignment for the vehicle 315A. In response to the first communication 330A, the first system client 310A can determine a vehicle service assignment for the vehicle 315A. This can include, for example, the transportation of a user 340A from a pick-up location to a drop-off location. The first system client 310A can provide, via the first frontend interface 305A, a first set of data 360 indicative of the vehicle service assignment (e.g., the pick-up location, drop-off location, route, etc.) to the vehicle 315A (e.g., the vehicle computing system 335A). In another example, the first communication 330A can include a request for assistance of the vehicle 315A and the first set of data 360 from the first system client 310A can include one or more control signals configured to control the motion of the vehicle 315A from a location that is remote from the vehicle 315A. In another example, the first communication 330A can include an indication that the vehicle 315A is available for a software deployment and the first set of data 360 from the first system client 310A can include data associated with the software deployment (e.g., an updated software package, etc.).

The operations computing system 355 (e.g., the API gateway 300) can obtain, via the first frontend interface 305A, the first set of data 360 from the first system client 310A. Moreover, the operations computing system 355 (e.g., the API gateway 300) can provide, via the first frontend interface 305A, the first set of data 360 to the vehicle 315A. In some implementations, the operations computing system 355 can validate, via the first frontend interface 305A, the set of data 360 using similar validation techniques as those performed on the first communication 330A. In the event that the set of data 360 is valid, the set of data 360 can be provided to the vehicle 315A. As such, the API gateway 300 (e.g., the frontend interface(s) 305A-D) can provide a fully bi-directional and secure communication tunnel between the vehicle 315A and the system clients 310A-B.

The vehicle computing system 335A of the vehicle 315A can obtain the first set of data 360 from the first system client 310A via the first frontend interface 305A of the API gateway 300. The vehicle computing system 335A can cause the vehicle 315A to react according to the first set of data 360. For example, the first set of data 360 from the system client 310A can include data indicative of a transportation service assignment. Accordingly, the vehicle computing system 335A can cause the vehicle 315A to implement a motion plan to navigate to a location to pick-up a user for the transportation service.

The vehicle computing system 335A can follow a similar process for other communications associated with the vehicle 315A. For example, the vehicle computing system 335A can generate a second communication 365 associated with the vehicle 315A (e.g., a request for a fleet-specific map update). The vehicle computing system 335A can provide the second communication 365 to the API gateway 300 (e.g., that is remote from the vehicle 315A). The API gateway 300 can be configured to provide, via a second frontend interface 305B (e.g., a fleet-specific frontend interface) of the plurality of frontend interfaces 305A-D of the API gateway 300, the second communication 365 associated with the vehicle 315A to a second system client 310B (e.g., a fleet-specific system client) of the plurality of system clients 310A-B. For example, the operations computing system 355 can obtain, via the API gateway 300, the second communication 365 associated with the vehicle 315A. The operations computing system 355 can determine a second frontend interface 305B of the API gateway based at least in part on the second communication 365 associated with the vehicle 315A, as described herein. Moreover, the operations computing system 355 can provide, via the second frontend interface 305B, the second communication 365 associated with the vehicle 315A to a second system client 310B (e.g., a fleet-specific system client) associated with the second frontend interface 305B (e.g., a fleet specific frontend interface). The operations computing system 355 (e.g., the API gateway 300) can obtain, via the second frontend interface 305B, a second set of data 370 (e.g., data indicative of a fleet-specific map update) from the second system client 310B and can provide, via the second frontend interface 305B, the second set of data 370 to the vehicle 315A. The vehicle computing system 335A can obtain such data and react accordingly (e.g., to implement the fleet-specific map update).

Another vehicle 315B (e.g., a vehicle computing system 335B associated therewith) and/or a third party computing system 320 can follow a similar process as vehicle 315A in order to communicate with the system client(s) 310A-B. For example, the vehicle computing system 335B of another vehicle 315B can provide a communication 330B (e.g., a vehicle service assignment request, etc.) to the API gateway 300, which can facilitate the communication of data between the other vehicle 315B and the system client(s) 310A-B via at least one frontend interface 305A-D, as described herein. Additionally, or alternatively, the third party system 320 can provide a communication 330C (e.g., a request for compensation associated with a vehicle service, etc.) to the API gateway 300, which can facilitate the communication of data between the third party computing system 320 and the system client(s) 310A-B via at least one frontend interface 305A-D. The other vehicle 315B and/or the third party system 320 can obtain a set of data from the system client(s) 310A-B in a similar manner to that described herein.

In some implementations, a vehicle 315A-B can be configured to selectively invoke an application programming interface of a plurality of application programming interfaces. For instance, a vehicle 315A-B can be configured to provide vehicle services for a plurality of entities, such as a first entity and a second entity. A vehicle computing system 335A-B of the vehicle 315A-B can identify the first entity as the entity for which the vehicle 315A-B should provide the vehicle service. In some implementations, this determination can be based at least in part on user input (e.g., to a user interface of the vehicle 315A-B). For example, the vehicle computing system 335A-B can obtain data indicative of user input provided to a user interface displayed via a display device onboard the vehicle 315A-B. The user input can select the first entity as the entity for which the vehicle 315A-B is to provide vehicle services. In some implementations, the selection of the first or second entity can be based at least in part on the demand for vehicle services of a particularly entity. For example, the vehicle computing system 335A-B can obtain data indicating that the demand for the vehicle services of the first entity are higher than the demand for the vehicle services of the second entity. In some implementations, the vehicle computing system 335A-B can obtain data indicative of an incentive (e.g., increase in compensation) to provide vehicle services for a particular entity and the vehicle computing system 335A-B can select that entity accordingly.

The vehicle computing system 335A-B can invoke, via a vehicle client, the application programming interface for the selected entity (e.g., the first entity). The vehicle computing system 335A-B can provide (e.g., via an API gateway) a communication to the operations computing system of the first entity to indicate that the vehicle 315A-B is available for a vehicle service assignment, obtain a vehicle service assignment, and provide and/or obtain other data, as described herein. In the event that the vehicle computing system 335A-B determines that the vehicle 315A-B should provide vehicle services for the second entity, the vehicle computing system 335A-B can terminate the session with the API gateway of the first entity (e.g., provided via a frontend interface). The vehicle computing system 335A-B can invoke the application programming interface of the second entity. Accordingly, the vehicle computing system 335A-B can provide (e.g., via another API gateway) a communication to the operations computing system of the second entity to indicate that the vehicle 315A-B is available for a vehicle service assignment, obtain a vehicle service assignment, and provide and/or obtain other data, as described herein. In this way, a vehicle 315A-B can selectively communicate with the computing systems of different entities, via different application programming interfaces.

Figure 5:
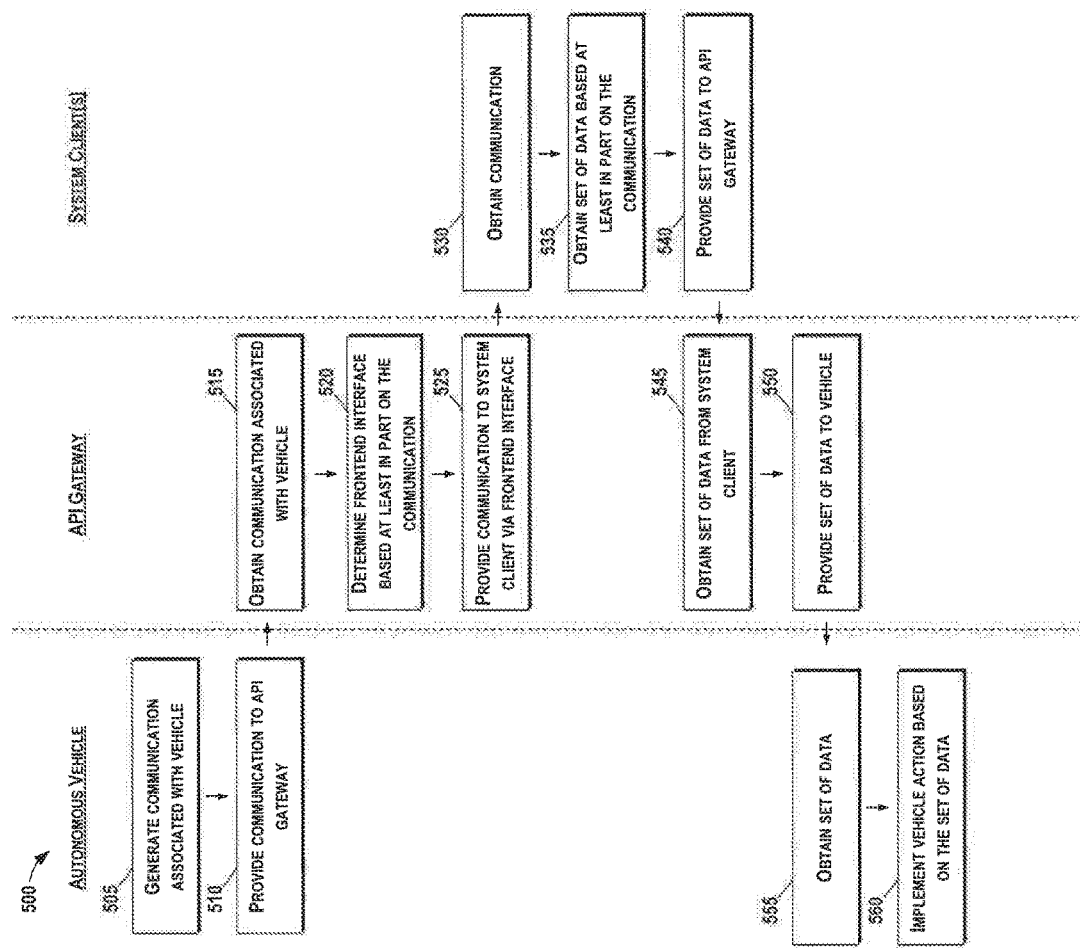
FIG. 5 depicts a flow diagram of an example method for facilitating communication with autonomous vehicles according to example embodiments of the present disclosure.

FIG. 5 depicts a flow diagram of an example method 500 for facilitating communication with vehicles (e.g., autonomous vehicles) according to example embodiments of the present disclosure. One or more portion(s) of the method 500 can be implemented by one or more computing systems that include, for example, a vehicle computing system (e.g., 105, 335A, 335B), one or more portions of an operations computing system (e.g., 115, 205A, 205B, 355, etc.) such as an API gateway (235A-B, 300) and/or one or more system client(s) (245A, 245B, 310A-B). The portions indicated as being performed by a vehicle can also, or alternatively, be performed by a computing system that is remote from the vehicle (e.g., a third party computing system 193, 320). Each respective portion of the method 500 can be performed by any (or any combination) of the computing device(s) of the respective computing system. Moreover, one or more portion(s) of the method 500 can be implemented as an algorithm on the hardware components of the device(s) described herein (e.g., as in FIGS. 1 and 6), for example, to facilitate communication between a vehicle and a remote computing system. FIG. 5 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (505), the method 500 can include generating a communication associated with a vehicle. For instance, a vehicle computing system 335A of a vehicle 315A can generate a communication 330A associated with the vehicle 315A. As described herein, the vehicle computing system 335A can be located onboard the vehicle 315A. The vehicle computing system 335A can obtain data indicative of a vehicle client 345A. The vehicle computing system 335A can access (e.g., using the vehicle client 345A) a library associated with the API gateway 300. As described herein, the library can be indicative of a plurality of parameters. The vehicle computing system 335A can generate the communication 330A associated with the vehicle 315A based at least in part on one or more of the plurality of parameters of the library.

The communication 330A can include a variety of information. For instance, the communication 330A can include an indication that the vehicle 315A is available to provide a vehicle service, vehicle state data associated with the vehicle 315A, a request for assistance of the vehicle 315A, a request for data associated with a user interface, and/or other data. The library can allow the vehicle computing system 335A to structure its communication based on the type of data to be transmitted and/or requested (e.g., using the definitions specified by the library parameters).

At (510), the method 500 can include providing the communication to an API gateway. For instance, the vehicle computing system 335A can provide (e.g., transmit, send, make available, etc.) the communication to an API gateway 300 that is remote from the vehicle 315A. The API gateway 300 can be stored, maintained, implemented, etc. on an operations computing system 355 (e.g., associated with an entity) that is remote from the vehicle 315A. The API gateway 300 can be configured to provide the communication 330A associated with the vehicle 315A to a system client 310A via a frontend interface 305A of a plurality of frontend interfaces 305A-D of the API gateway 300. Each of the plurality of frontend interfaces 305A-D can be associated with at least one of a plurality of system clients 310A-B, as described herein. Moreover, each of the frontend interfaces 305A-D can include one or more functions 325A-I. The vehicle computing system 335A can provide the communication 330A to call, for example, a function 325A (e.g., "Get Assignment" function, etc.) associated with a frontend interface 305A (e.g., a vehicle service frontend interface).

At (515), the operations computing system 355 can obtain the communication 330A associated with the vehicle 315A. For instance, the operations computing system 355 can obtain a communication 330A associated with a vehicle 315A via the API gateway 300. This can include receiving the communication 330A directly from the vehicle computing system 335A and/or indirectly from the vehicle computing system 335A (e.g., via proxy).

At (520), the method 500 can include determining a frontend interface based at least in part on the communication. For instance, the API gateway 300 can include a plurality of frontend interfaces 305A-D, each associated with one or more system clients 310A-B. The operations computing system 355 (e.g., the API gateway 300) can process the communication 330A (e.g., the contents of the communication, the metadata associated therewith, etc.) to identify at least one frontend interface of the plurality of frontend interfaces 305A-D. For example, the operations computing system 355 (e.g., the API gateway 300) can identify the vehicle service frontend interface for a communication 330A that requests a vehicle service assignment (e.g., a transportation service assignment).

At (525), the method 500 can include providing a communication to a system client via a frontend interface. For instance, the operations computing system 355 (e.g., the API gateway 300) can provide the communication 330A associated with the vehicle 315A to at least one system client 310A via at least one of the frontend interfaces 305A-D. In some implementations, the operations computing system 355 (e.g., a frontend interface) can validate the communication 330A (e.g., before it is received by the system client). The plurality of system clients 310A-B can be associated with an entity, as described herein. In some implementations, the vehicle 315A can be included in a fleet of vehicles of the entity. Thus, the systems and methods of the present disclosure can help the fleet vehicles access the back-end services of the system clients 310A-B. In some implementations, the vehicle 315A may not be included in a fleet of vehicles of the entity. Thus, the systems and methods of the present disclosure can allow a non-fleet vehicle to access the back-end services of the system clients 310A-B. In some implementations, the vehicle 315A may be registered with the operations computing system 355 by a party other than the entity (e.g., via the user of a cryptography key). Thus, the systems and methods of the present disclosure can allow vehicles that are registered by a non-entity party to access the back-end services of the system clients 310A-B.

At (530), a system client 310A (of the operations computing system 355) can obtain the communication 330A. As described herein, the system client 310A can obtain a set of data 360 based at least in part on the communication 330A, at (535). For example, the communication 330A can include an indication that the vehicle 315A is available to provide a transportation service. In response, the system client 310A can generate a transportation service assignment for the vehicle 315A. The set of data 360 can include data indicative of the transportation service assignment. The system client 310A can provide the set of data 360 to the API gateway 300, via at least one frontend interface 305A, at (540). The operations computing system 355 (e.g., the API gateway 300) can obtain the set of data 360 from the at least one system client 310A via the at least one frontend interface 305A, at (545). In some implementations, the at least one frontend interface 305A can be configured to validate the set of data 360, as described herein. At (550), the operations computing system (e.g., the API gateway 300) can provide the set of data 360 to the vehicle 315A via the at least one frontend interface 305A.

At (555), the vehicle computing system 335A can obtain the set of data 360 from a system client 310A via the frontend interface 305A of the API gateway 300, as described herein. In response, the vehicle computing system 335A can implement one or more vehicle actions, at (560). For instance, the vehicle computing system 335A can cause the vehicle 315A to perform one or more vehicle actions based at least in part on the set of data 360. By way of example, in the event that the set of data 360 includes a software deployment, the vehicle computing system 335A can implement the software deployment onto one or more of the vehicle's onboard computing devices. In another example, the set of data 360 can include data indicative of a vehicle assignment for providing a vehicle service. The vehicle computing system 335A can send one or more control signals to cause the vehicle 315A to initiate a motion control in accordance with the vehicle service assignment (e.g., to travel to a pick-up location). In another example, the set of data 360 from the system client 310A can include one or more control signals configured to control the motion of the vehicle 315A from a location that is remote from the vehicle 315A. The vehicle computing system 335A can implement the control signal(s) such that the vehicle 315A responds to the control signals accordingly.

Figure 6:
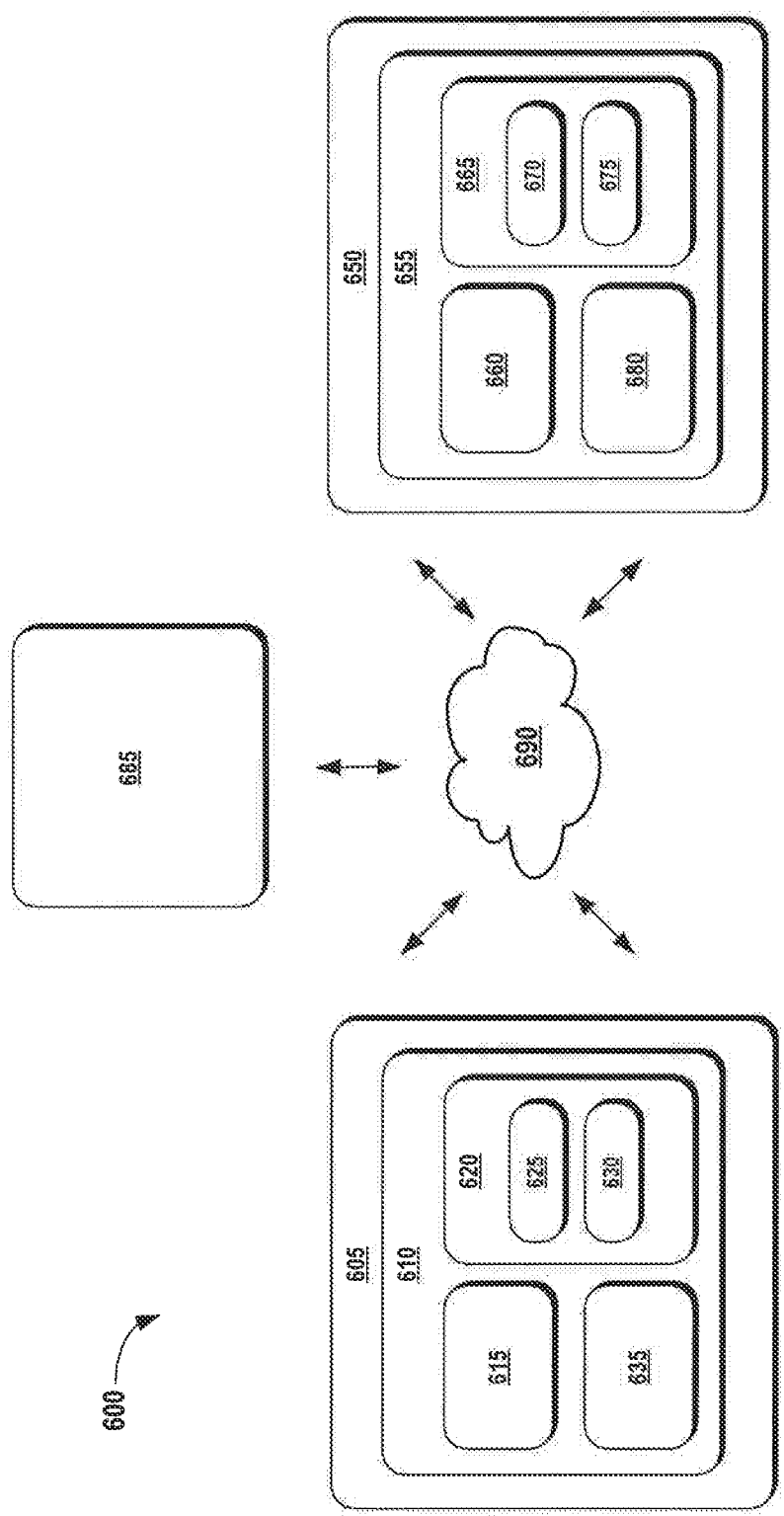
FIG. 6 depicts example system components according to example embodiments of the present disclosure.

FIG. 6 depicts an example system 600 according to example embodiments of the present disclosure. The example system 600 illustrated in FIG. 6 is provided as an example only. The components, systems, connections, and/or other aspects illustrated in FIG. 6 are optional and are provided as examples of what is possible, but not required, to implement the present disclosure. The example system 600 can include a vehicle computing system 605 of a vehicle. The vehicle computing system 605 can represent/correspond to any of the vehicle computing systems (e.g., 105, 335A-B) described herein. The example system 600 can include a remote system 650. The remote system 650 can represent/correspond to any of the operations computing systems (e.g., 115, 205A-B, 355) described herein. The example system 600 can include a third party computing system 685 that can represent/correspond to any of the third party computing systems (e.g., 193, 320) described herein. These systems can be communicatively coupled to one another over one or more network(s) 690.

The computing device(s) 610 of the vehicle computing system 605 can include processor(s) 615 and a memory 620. The one or more processors 615 can be any suitable processing device (e.g., a processor core, a microprocessor, an ASIC, a FPGA, a controller, a microcontroller, etc.) and can be one processor or a plurality of processors that are operatively connected. The memory 620 can include one or more non-transitory computer-readable storage media, such as RAM, ROM, EEPROM, EPROM, one or more memory devices, flash memory devices, data registrar, etc., and combinations thereof.

The memory 620 can store information that can be accessed by the one or more processors 615. For instance, the memory 620 (e.g., one or more non-transitory computer-readable storage mediums, memory devices) on-board the vehicle can include computer-readable instructions 625 that can be executed by the one or more processors 615. The instructions 625 can be software written in any suitable programming language or can be implemented in hardware. Additionally, or alternatively, the instructions 625 can be executed in logically and/or virtually separate threads on processor(s) 615.

For example, the memory 620 on-board the vehicle can store instructions 625 that when executed by the one or more processors 615 on-board the vehicle cause the one or more processors 615 (the vehicle computing system 605) to perform operations such as any of the operations and functions of the vehicle computing systems 105, 335A-B, the operations and functions for generating, providing, and obtaining communications to and/or from a vehicle, any of the operations and functions for which the vehicle computing systems 105, 335A-B are configured, one or more portions of the method 500, and/or any other operations and functions of the vehicle computing systems described herein.

The memory 620 can store data 630 that can be obtained (e.g., acquired, received, retrieved, accessed, written, manipulated, created, stored, etc.). The data 630 can include, for instance, sensor data, map data, vehicle state data, perception data, prediction data, motion planning data, data associated with a human-machine interface, data associated with a vehicle client, data associated with a library, data associated with library parameters, communications, data from a system client, and/or other data/information such as that described herein. In some implementations, the computing device(s) 610 can obtain data from one or more memories that are remote from the vehicle.

The computing device(s) 610 can also include a communication interface 635 used to communicate with one or more other system(s) on-board a vehicle and/or a remote computing device that is remote from the vehicle (e.g., of the systems 650, 685). The communication interface 635 can include any circuits, components, software, etc. for communicating via one or more networks (e.g., network(s) 690). The communication interface 635 can include, for example, one or more of a communications controller, receiver, transceiver, transmitter, port, conductors, software and/or hardware for communicating data.

The remote system 650 can include one or more computing device(s) 655 that are remote from the vehicle computing system 605. The computing device(s) 655 can include one or more processors 660 and a memory 665. The one or more processors 660 can be any suitable processing device (e.g., a processor core, a microprocessor, an ASIC, a FPGA, a controller, a microcontroller, etc.) and can be one processor or a plurality of processors that are operatively connected. The memory 665 can include one or more tangible, non-transitory computer-readable storage media, such as RAM, ROM, EEPROM, EPROM, one or more memory devices, flash memory devices, data registrar, etc., and combinations thereof.

The memory 665 can store information that can be accessed by the one or more processors 660. For instance, the memory 656 (e.g., one or more tangible, non-transitory computer-readable storage media, one or more memory devices, etc.) can include computer-readable instructions 670 that can be executed by the one or more processors 660. The instructions 670 can be software written in any suitable programming language or can be implemented in hardware. Additionally, or alternatively, the instructions 670 can be executed in logically and/or virtually separate threads on processor(s) 660.

For example, the memory 665 can store instructions 670 that when executed by the one or more processors 660 cause the one or more processors 660 to perform operations such as any of the operations and functions of the operations computing systems 115, 205A-B, 355 and/or for which the operations computing systems 115, 205A-B, 355 are configured, any of the operations and functions of an API gateway 235A-B, 300 and/or for which an API gateway 300 is configured, any of the operations and functions of a frontend interface and/or for which the frontend interfaces are configured, any of the operations and functions of a system client 310A-B and/or for which the system clients 310A-B are configured, as described herein, and/or any other operations and functions described herein.

The memory 665 can store instructions 670 of the application programming interface 191. For instance, as described herein, the application programming interface 191 can include instructions for any of the operations and functions described herein. For instance, the application programming interface 191 can include instructions for obtaining, via an API gateway, a communication associated with a vehicle (e.g., an autonomous vehicle); determining a frontend interface of a plurality of frontend interfaces of the API gateway based at least in part on the communication associated with the vehicle; and providing, via the frontend interface, the communication associated with the vehicle to a system client. As described herein, the communication can call a function associated with the frontend interface, and application programming interface 191 can include instructions for providing the communication via the function associated with the frontend interface. The application programming interface 191 can include instructions for obtaining, via the frontend interface, a set of data from the system client and providing, via the frontend interface, the set of data to the vehicle. The application programming interface 191 can include instructions for validating, by the frontend interface, the communication associated with the autonomous vehicle and/or validating, by the frontend interface, the set of data from the system client.

The memory 665 can store data 675 that can be obtained. The data 675 can include, for instance, communications associated with/provided by vehicles, data to be provided to vehicles, application programming interface data, API gateway data, frontend interface data, and/or other data/information such as that described herein. In some implementations, the computing device(s) 655 can obtain data from one or more memories that are remote from the system 650 and/or are onboard a vehicle.

The computing device(s) 655 can also include a communication interface 680 used to communicate with one or more system(s) onboard a vehicle and/or another computing device that is remote from the system 650. The communication interface 680 can include any circuits, components, software, etc. for communicating via one or more networks (e.g., network(s) 690). The communication interface 680 can include, for example, one or more of a communications controller, receiver, transceiver, transmitter, port, conductors, software and/or hardware for communicating data.

The third party system 685 can include one or more computing device(s) that are remote from the vehicle computing system 605 and the computing system 650. The computing device(s) of the third party system 685 can include one or more processors and a memory similar to those described with respect to the other systems of FIG. 6.

The network(s) 690 can be any type of network or combination of networks that allows for communication between devices. The network(s) 690 can represent/correspond to the network(s) 230A-B described herein. In some embodiments, the network(s) 690 can include one or more of a local area network, wide area network, the Internet, secure network, cellular network, mesh network, peer-to-peer communication link and/or some combination thereof and can include any number of wired or wireless links. Communication over the network(s) 690 can be accomplished, for instance, via a communication interface using any type of protocol, protection scheme, encoding, format, packaging, etc.

Computing tasks discussed herein as being performed at computing device(s) at the vehicle can instead be performed remote from the vehicle, or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for execution by an autonomous vehicle for communicating with at least one remote computing system, the method comprising:
    generating, by a vehicle computing system of the autonomous vehicle, a communication associated with the autonomous vehicle, the vehicle computing system being located onboard the autonomous vehicle, and the vehicle computing system comprising one or more computing devices; and
    providing, by the vehicle computing system, the communication to an application programming interface gateway that is remote from the autonomous vehicle,
    the application programming interface gateway being configured to provide the communication associated with the autonomous vehicle to a system client via a frontend interface of a plurality of frontend interfaces of the application programming interface gateway, and each of the plurality of frontend interfaces being associated with at least one of a plurality of system clients.

2. The computer-implemented method of claim 1, further comprising:
    obtaining, by the vehicle computing system, a set of data from the system client via the frontend interface of the application programming interface gateway.

3. The computer-implemented method of claim 1, wherein the plurality of system clients are associated with an entity and the autonomous vehicle is included in a fleet of autonomous vehicles of the entity.

4. The computer-implemented method of claim 1, wherein the plurality of system clients are associated with an entity and the autonomous vehicle is not included in a fleet of autonomous vehicles of the entity.

5. The computer-implemented method of claim 1, wherein generating the communication associated with the autonomous vehicle comprises:
    accessing, by the vehicle computing system, a library associated with the application programming interface gateway, wherein the library is indicative of a plurality of parameters; and
    generating, by the vehicle computing system, the communication associated with the autonomous vehicle based at least in part on one or more of the plurality of parameters of the library.

6. The computer-implemented method of claim 1, wherein providing, by the vehicle computing system, the communication to the application programming interface gateway that is remote from the autonomous vehicle comprises:
    providing, by the vehicle computing system, the communication to call a function associated with the frontend interface.

7. The computer-implemented method of claim 1, wherein the communication associated with the autonomous vehicle comprises an indication that the autonomous vehicle is available to provide a vehicle service.

8. The computer-implemented method of claim 2, wherein the set of data from the system client comprises data indicative of a vehicle assignment for providing a vehicle service.

9. The computer-implemented method of claim I, wherein the communication associated with the autonomous vehicle comprises vehicle state data associated with the autonomous vehicle.

10. The computer-implemented method of claim 2, wherein the communication associated with the autonomous vehicle comprises a request for assistance of the autonomous vehicle, and wherein the set of data from the system client comprises one or more control signals configured to control motion of the autonomous vehicle from a location that is remote from the autonomous vehicle.

11. The computer-implemented method of claim 1, wherein the communication associated with the autonomous vehicle comprises a request for data associated with a user interface.

12. An autonomous vehicle computing system, comprising:
    one or more processors located onboard an autonomous vehicle; and
    one or more non-transitory, computer readable media located onboard the autonomous vehicle, the one or more tangible, non-transitory computer readable media, collectively storing instructions that when executed by the one or more processors cause the autonomous vehicle computing system to perform operations comprising:
        generating a first communication associated with the autonomous vehicle; and
        providing the first communication from the autonomous vehicle to an application programming interface gateway that is remote from the autonomous vehicle,
        the application programming interface gateway being configured to provide, via a first frontend interface of a plurality of frontend interfaces of the application programming interface gateway, the first communication associated with the autonomous vehicle to a first system client of a plurality of system client, each of the plurality of frontend interfaces being associated with at least one of a plurality of system clients, and
            the first frontend interface being associated with the first system client.

13. The autonomous vehicle computing system of claim 12, wherein the operations further comprise:
    obtaining from the first system client, via the application programming interface gateway, data indicative of a request for data associated with the autonomous vehicle, and
    wherein generating the first communication associated with the autonomous vehicle comprises generating the first communication associated with the autonomous vehicle in response to the request for data.

14. The autonomous vehicle computing system of claim 12, wherein the autonomous vehicle computing system is remote from the autonomous vehicle.

15. The autonomous vehicle computing system of claim 12, wherein the autonomous vehicle is located in a geographic region, and wherein a portion of a telecommunications network system comprises the application programming interface gateway, and wherein the portion of the telecommunications network system is associated with the geographic region.

16. The autonomous vehicle computing system of claim 12, wherein the operations further comprise:
generating a second communication associated with the autonomous vehicle;
providing the second communication to the application programming interface gateway that is remote from the autonomous vehicle,
wherein the application programming interface gateway is configured to provide, via a second frontend interface of the plurality of frontend interfaces of the application programming interface gateway, the second communication associated with the autonomous vehicle to a second system client of the plurality of system clients.

17. An autonomous vehicle comprising:
a vehicle client;
one or more processors; and
one or more tangible, non-transitory, computer readable media that collectively store instructions that when executed by the one or more processors cause the one or more processors to perform operations comprising:
generating, via the vehicle client, a first communication associated with the autonomous vehicle; and
providing the first communication to an application programming interface gateway that is remote from the autonomous vehicle,
the application programming interface gateway being configured to provide, via a first frontend interface of a plurality of frontend interfaces of the application programming interface gateway, the first communication associated with the autonomous vehicle to a first system client that is remote from the autonomous vehicle, wherein each of the plurality of frontend interfaces is associated with at least one of a plurality of system clients, and wherein the first frontend interface is associated with the first system client.

18. The autonomous vehicle of claim 17, wherein the operations further comprise:
obtaining a set of data from the first system lient via the first frontend interface of the application programming interface gateway.

19. The autonomous vehicle of claim 18, wherein the first communication comprises an indication that the autonomous vehicle is available to provide a transportation service.

20. The autonomous vehicle of claim 19, wherein the set of data from the first system client comprises data indicative of a transportation service assignment.

* * * * *

UNITED STATES PATENT AND TRADEMARK OFFICE
CERTIFICATE OF CORRECTION

PATENT NO. : 11,729,270 B2
APPLICATION NO. : 15/918599
DATED : August 15, 2023
INVENTOR(S) : Way et al.

It is certified that error appears in the above-identified patent and that said Letters Patent is hereby corrected as shown below:

In the Claims

In Column 46, Line 12, in Claim 9, delete "claim I," and insert --claim 1,-- therefor In Column 46, Line 34, in Claim 12, delete "media," and insert --media-- therefor In Column 46, Line 52, in Claim 12, after "and", delete a linebreak In Column 48, Line 18, in Claim 18, delete "lient" and insert --client-- therefor Signed and Sealed this
Fourteenth Day of November, 2023

Katherine Kelly Vidal
*Director of the United States Patent and Trademark Office*